(12) United States Patent
Beaver et al.

(10) Patent No.: US 11,046,005 B2
(45) Date of Patent: Jun. 29, 2021

(54) WASTE DISPOSAL FOR 3D PRINTING

(71) Applicant: Stratasys Ltd., Rehovot (IL)

(72) Inventors: Scott Wayne Beaver, San Marcos, CA (US); Andrew James Carlson, Hopkins, MN (US); Adam Joseph Livingston, Oceanside, CA (US)

(73) Assignee: Stratasys Ltd., Rehovot (IL)

( * ) Notice: Subject to any disclaimer, the term of this patent is extended or adjusted under 35 U.S.C. 154(b) by 170 days.

(21) Appl. No.: 15/744,087

(22) PCT Filed: Jul. 13, 2016

(86) PCT No.: PCT/IL2016/050754
§ 371 (c)(1),
(2) Date: Jan. 12, 2018

(87) PCT Pub. No.: WO2017/009833
PCT Pub. Date: Jan. 19, 2017

(65) Prior Publication Data
US 2018/0201021 A1    Jul. 19, 2018

Related U.S. Application Data

(60) Provisional application No. 62/191,687, filed on Jul. 13, 2015.

(51) Int. Cl.
*B29C 64/35* (2017.01)
*B33Y 40/00* (2020.01)
(Continued)

(52) U.S. Cl.
CPC ............ *B29C 64/35* (2017.08); *B29C 64/112* (2017.08); *B29C 64/264* (2017.08);
(Continued)

(58) Field of Classification Search
CPC .................... B29C 67/0096; B29C 67/0059
See application file for complete search history.

(56) References Cited

U.S. PATENT DOCUMENTS

2003/0063138 A1    4/2003 Varnon et al.
2007/0063366 A1*   3/2007 Cunningham .......... B29C 64/35
                                                         264/37.1
(Continued)

FOREIGN PATENT DOCUMENTS

CN    101444959    6/2009
JP    2005-504653  4/2003
(Continued)

OTHER PUBLICATIONS

International Preliminary Report on Patentability dated Jan. 25, 2018 From the International Bureau of WIPO Re. Application No. PCT/IL2016/050754. (8 Pages).
(Continued)

*Primary Examiner* — Jacob T Minskey
*Assistant Examiner* — Jennifer A Kessie

(57) ABSTRACT

Additive manufacturing or 3D printing produces considerable quantities of waste ink or resin during the course of additive manufacture. The waste ink is a hazardous substance and must be collected and disposed of accordingly. The present embodiments provide a waste ink collection device that collects the waste ink from the printing process, or from head cleaning and other incidental operations, stores the waste and cures it. The waste ink is thus rendered safe for conventional disposal. A waste ink disposal cartridge collects the waste ink and carries out curing.

5 Claims, 30 Drawing Sheets

(51) Int. Cl.
    B29C 64/112    (2017.01)
    B29C 64/264    (2017.01)
    B29C 64/393    (2017.01)
    B41J 2/17      (2006.01)
    B33Y 10/00     (2015.01)
    B33Y 30/00     (2015.01)
    B33Y 50/02     (2015.01)
    B41J 2/185     (2006.01)

(52) U.S. Cl.
    CPC ............ *B29C 64/393* (2017.08); *B33Y 40/00* (2014.12); *B41J 2/1721* (2013.01); *B33Y 10/00* (2014.12); *B33Y 30/00* (2014.12); *B33Y 50/02* (2014.12); *B41J 2002/1856* (2013.01)

(56) References Cited

U.S. PATENT DOCUMENTS

| | | | |
|---|---|---|---|
| 2009/0214398 A1 | 8/2009 | Hirata et al. | |
| 2010/0249486 A1 | 9/2010 | Bar Nathan et al. | |
| 2015/0093552 A1* | 4/2015 | Biskop .................. | B29C 64/209 428/201 |

FOREIGN PATENT DOCUMENTS

| | | |
|---|---|---|
| JP | 2007-296854 | 11/2007 |
| JP | 2009-202389 | 9/2009 |
| JP | 2013-067016 | 4/2013 |
| JP | 2014-504971 | 7/2014 |
| JP | 2015-021016 | 2/2015 |
| JP | 2015-517414 | 4/2015 |
| WO | WO 2013/167415 | 11/2013 |
| WO | WO 2017/009833 | 1/2017 |

OTHER PUBLICATIONS

International Search Report and the Written Opinion dated Sep. 28, 2016 From the International Searching Authority Re. Application No. PCT/IL2016/050754.
Translation dated May 26, 2019 of Notification of Office Action dated May 7, 2019 From the State Intellectual Property Office of the People's Republic of China Re. Application No. 201680040810.7. (7 Pages).
Notification of Office Action and Search Report dated May 7, 2019 From the State Intellectual Property Office of the People's Republic of China Re. Application No. 201680040810.7. (7 Pages).
Communication Pursuant to Article 94(3) EPC dated Jan. 25, 2019 From the European Patent Office Re. Application No. 16744545.1. (4 Pages).
Notification of Office Action dated Jan. 22, 2020 From the National Intellectual Property Administration of the People's Republic of China Re. Application No. 201680040810.7 and Its Translation Into English. (7 Pages).
Notice of Reason for Rejection dated Jun. 19, 2020 From the Japan Patent Office Re. Application No. 2019-127880 and Its Translation Into English. (10 Pages).
Notice of Reason for Rejection dated Oct. 23, 2020 From the Japan Patent Office Re. Application No. 2019-127880 and Its Translation Into English.(6 Pages).
Office Action dated Mar. 24, 2021 From the Israel Patent Office Re. Application No. 256864 and Its Translation Into English. (5 Pages).

* cited by examiner

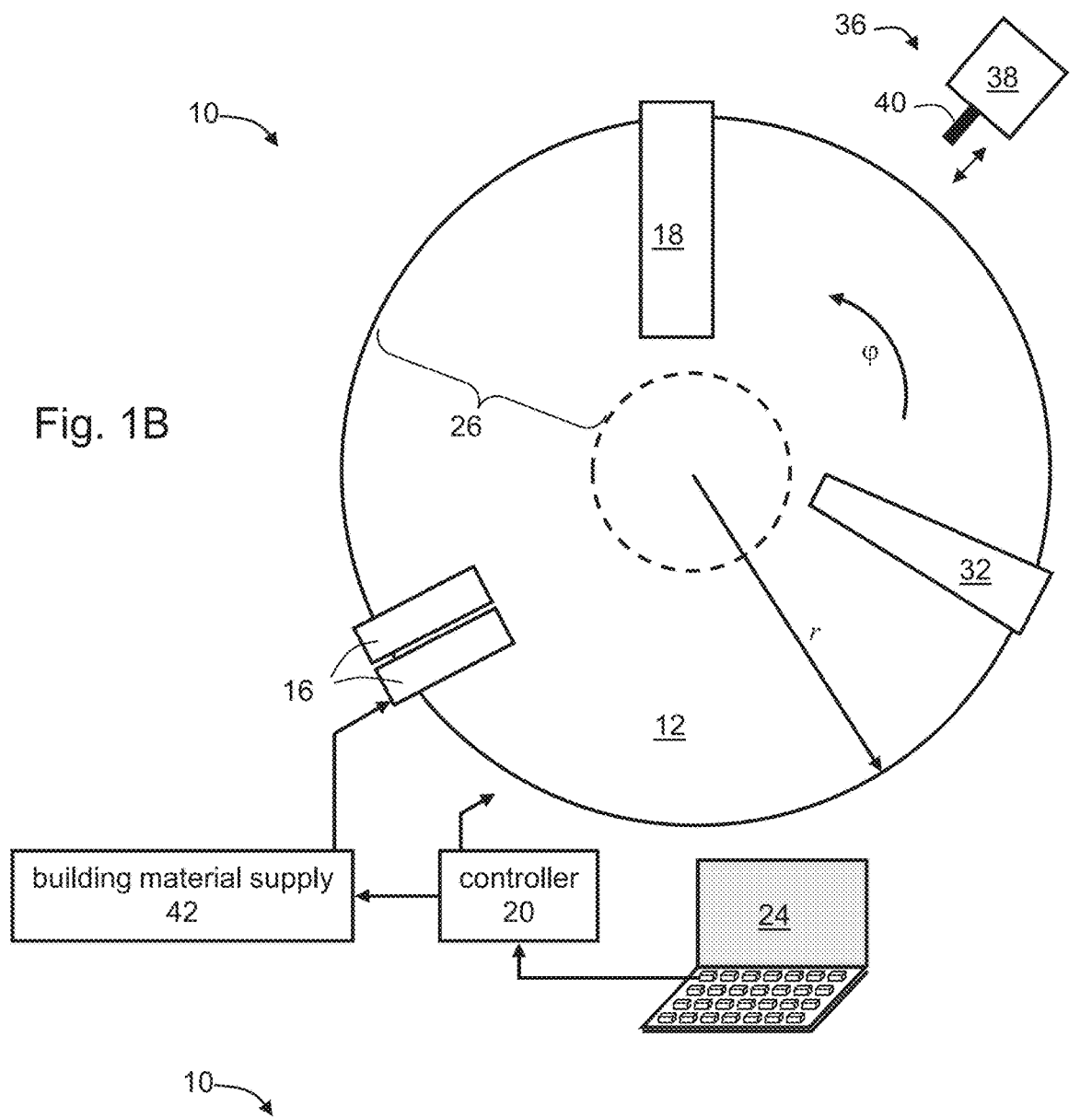
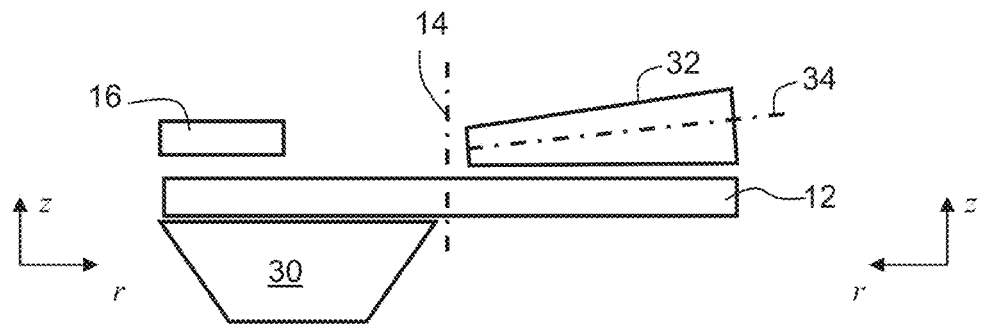

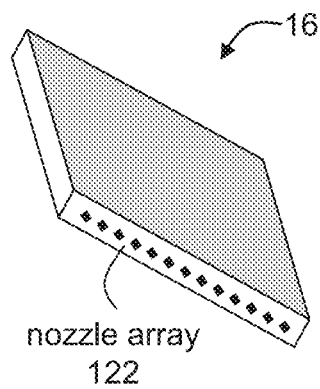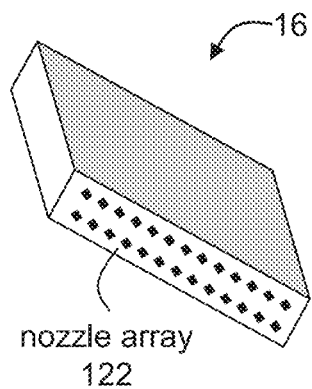
Fig. 2A  Fig. 2B
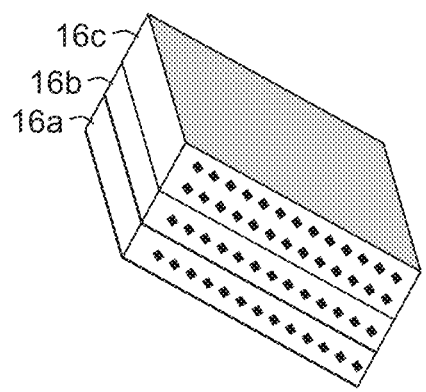
Fig. 2C

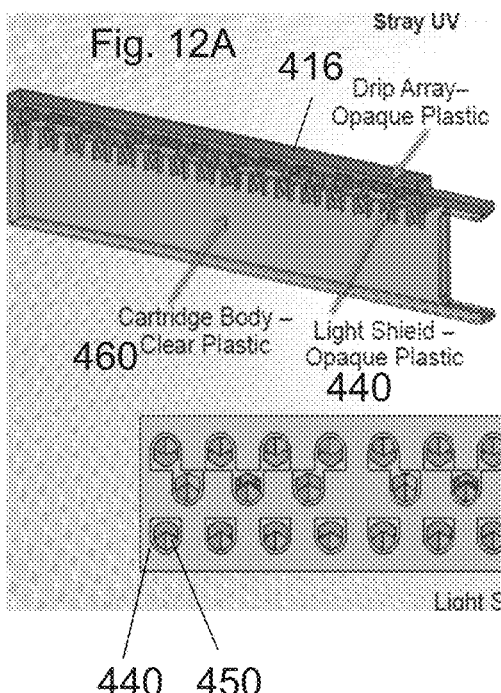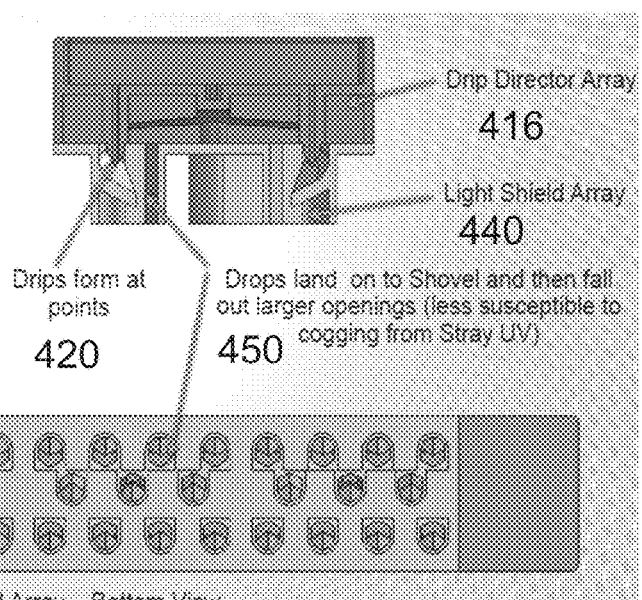
Fig. 12A, Fig. 12B, Fig. 12C

270

284

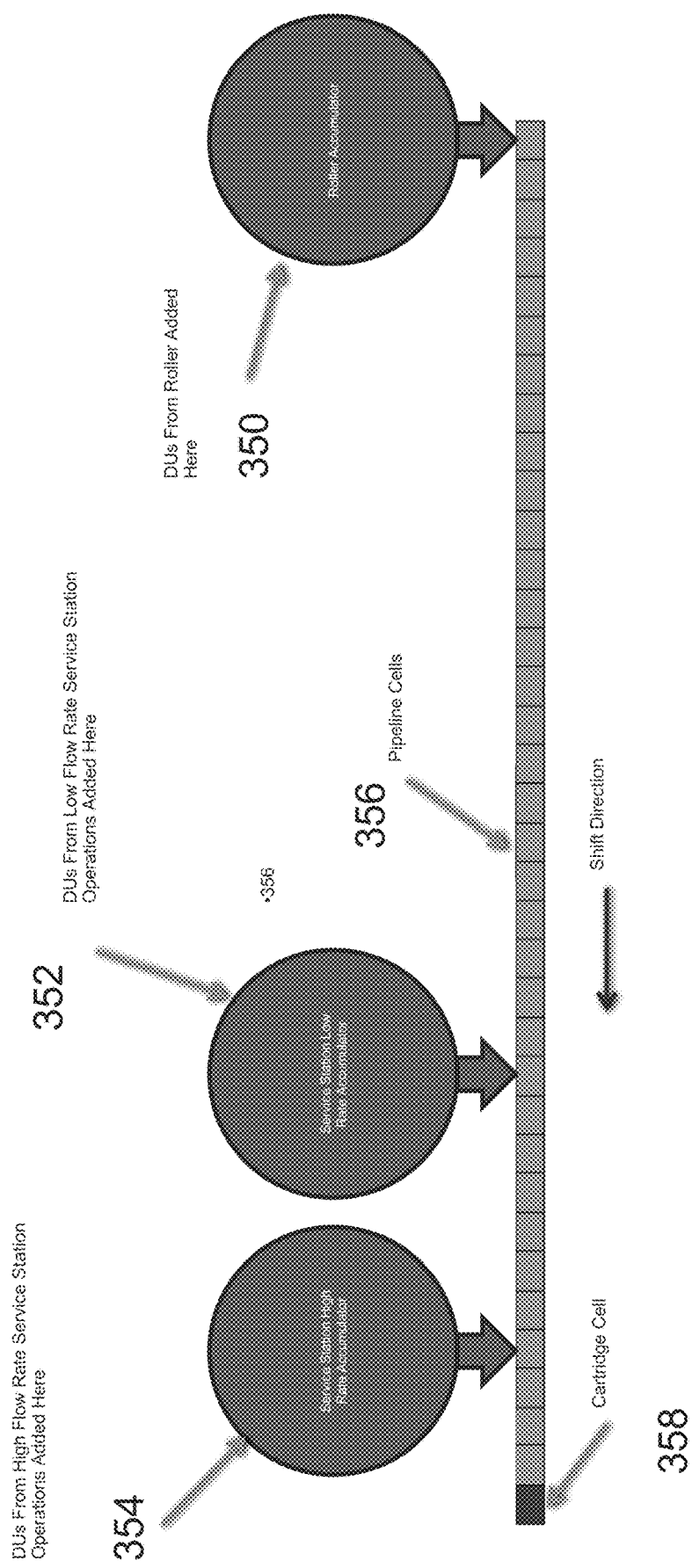

WASTE DISPOSAL FOR 3D PRINTING

RELATED APPLICATIONS

This application is a National Phase of PCT Patent Application No. PCT/IL2016/050754 having International filing date of Jul. 13, 2016, which claims the benefit of priority under 35 USC § 119(e) of U.S. Provisional Patent Application No. 62/191,687 filed on Jul. 13, 2015. The contents of the above applications are all incorporated by reference as if fully set forth herein in their entirety.

FIELD AND BACKGROUND OF THE INVENTION

The present invention, in some embodiments thereof, relates to a method and apparatus for waste disposal in 3D printing or additive manufacture and, more particularly, but not exclusively, to a method of waste disposal which is environmentally safe.

3D printing, otherwise known as additive manufacture, is a technology which has been developed and improved over the last two decades and is now practical and useful for industrial applications. 3D printing builds unit objects from the bottom-up by adding material layer-by-layer, and is thus able to form uniquely individual parts with incomparably complex shapes.

3D printing is carried out using special inks or resins which are jetted using nozzles when in liquid form to form a layer, then the layer is rolled with a roller to form a smooth shape, and following rolling the layer is cured using LED light to solidify the ink.

The roller generates a significant amount of waste, being some 10-30% of the volume of ink in the original jetting operation. Additional ink waste is generated by head maintenance procedures such as purging the heads and spitting out residue inks. The liquid waste resin is considered a hazardous substance and requires to be stored and disposed of properly. Needless to say, removing some 30% of the ink in liquid form after use is a considerable overhead in printer operation and environmentally friendly disposal is costly.

Currently, the waste is collected and pumped into a disposable container which, when full is shipped to a disposal facility. The facility treats the waste and disposes of it in the appropriate manner.

SUMMARY OF THE INVENTION

The present embodiments aim to solve the problems of the prior art by removing the need for safe disposal of unused liquid resins.

The unused liquid resins are automatically collected and may be cured. The cured ink is no longer a hazardous material and standard disposal can be used. Curing may be carried out during collection, that is immediately following the generation of the waste, and the present embodiments may provide that at no time is there any significant store of hazardous waste.

According to an aspect of some embodiments of the present invention there is provided additive manufacturing apparatus producing waste ink during the course of additive manufacture, the apparatus comprising:

a waste ink collection device configured to collect waste ink from the additive manufacturing location; and a waste ink curing device configured to cure the waste ink upon collection.

In an embodiment, the waste ink curing device comprises:

a collecting cartridge to collect the waste ink in liquid form; and a curing energy source to cure the waste ink.

In an embodiment, the waste ink curing device further comprises a switch to operate the curing energy source when the ink is evenly distributed in the cartridge.

In an embodiment, the switch is configured to delay the operating the curing energy source to allow time for droplets of the waste ink dropped into the cartridge to merge.

In an embodiment, the waste ink collecting device comprises:

a reservoir for collecting the waste ink from a roller or from printing head servicing; and a tubing system for distributing the waste ink to drip points distributed evenly over a collecting cartridge.

In an embodiment, the waste ink collecting cartridge comprises an array of distributed drip points for even distribution of the waste ink over the waste collecting cartridge.

In an embodiment, the curing energy source is located to radiate energy evenly over the cartridge.

In an embodiment, the curing energy source comprises a bank or a strip of light emitting diodes, typically UV light emitting diodes.

In an embodiment, the curing energy source is located lengthwise along the cartridge towards one side.

In an embodiment, the drip points comprise shielding against curing energy from the source, to protect waste ink from being cured prior to dripping from the drip points.

In an embodiment, the shielding comprises hoods surrounding each drip point.

An embodiment may comprise a dispensing shovel below each drip point to direct dripping.

In an embodiment, the curing energy source comprises three banks of diodes, a first located lengthwise on a first side of the cartridge, a second located lengthwise on a second side of the cartridge and a third located lengthwise above the exit points, the third bank configured for single operation upon the cartridge reaching a full state to cure undripped ink.

In an embodiment, the cartridge comprises a level detector to detect a current level of waste ink in the cartridge, thereby to determine when the cartridge is full.

In an embodiment, the level detector comprises a prism having an index of refraction selected to cause total internal reflection except when surrounded by the waste ink.

In an embodiment, the curing energy source comprises first and second banks of diodes each directed at an oblique angle towards a floor of the cartridge.

According to a second aspect of the present invention there is provided a method for waste ink management during additive manufacturing comprising:

delivering ink to an additive manufacturing location;

collecting waste ink from the additive manufacturing location; and curing the waste ink upon collection.

The method may comprise:

monitoring a waste ink flow rate; and operating the curing in accordance with the waste ink flow rate.

In an embodiment, the waste ink curing comprises:

collecting the waste ink in liquid form; and curing the waste ink with curing energy.

The method may operate the curing energy source after allowing for the ink to be evenly distributed in the cartridge.

The method may comprise delaying the operating the curing energy source to allow time for droplets of the waste ink dropped into the cartridge to merge.

In an embodiment, the waste ink collecting comprises:
collecting the waste ink from a roller or from printing head servicing; and
distributing the waste ink evenly over a collecting cartridge.

The method may comprise radiating curing energy evenly over the cartridge.

The method may comprise:
detecting when the cartridge is full; and
irradiating drip pipes of the cartridge to cure undripped ink.

According to a third aspect of the present invention there is provided a cartridge for receiving waste ink from an additive manufacturing device; the cartridge comprising a distribution head, a curing source and a container, wherein the distribution head comprises an inlet pipe and an array of drip points distributed over the cartridge, wherein the drip points are respectively surrounded shielding to protect from direct irradiation from the curing source; and the curing source comprises a plurality of radiation locations arranged around the container.

The drip points may comprise sharp terminations for droplet formation.

The cartridge may comprise drip-directing shovels below each of the drip points and within the shielding.

The cartridge may comprise a second curing source within the distribution head for curing ink remaining in the distribution head when the cartridge is full.

The cartridge may comprise a level detector to detect filling of the cartridge. The level detector may use an LED, a detector and simple reflection, or a prism, as discussed herein.

According to a third aspect of the present invention there is provided a method of controlling curing in an additive manufacturing apparatus producing waste ink during the course of additive manufacture, the apparatus comprising:
a waste ink collection device configured to collect waste ink from the additive manufacturing location; and
a waste ink curing device configured to cure said waste ink upon collection, the method comprising:
estimating a resin flow to said waste ink collection device;
using said estimate to calculate timing and quantity of resin arriving at said waste ink collection device; and
operating said curing at a timing and dosage suitable for said calculated quantity.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:
FIGS. 1A, 1B, 1C and 1D are schematic illustrations of an additive manufacturing system according to some embodiments of the invention;
FIGS. 2A, 2B and 2C are schematic illustrations of printing heads according to some embodiments of the present invention;
FIGS. 12A, 12B and 12C are three cutaway views of a waste ink collecting cartridge according to an embodiment of the present invention.

FIG. 37 illustrates a virtual waste pipeline model for predicting resin flows in order to calculate correct timing and dosage of curing according to an embodiment of the present invention.

DESCRIPTION OF SPECIFIC EMBODIMENTS OF THE INVENTION

Figure 1A:
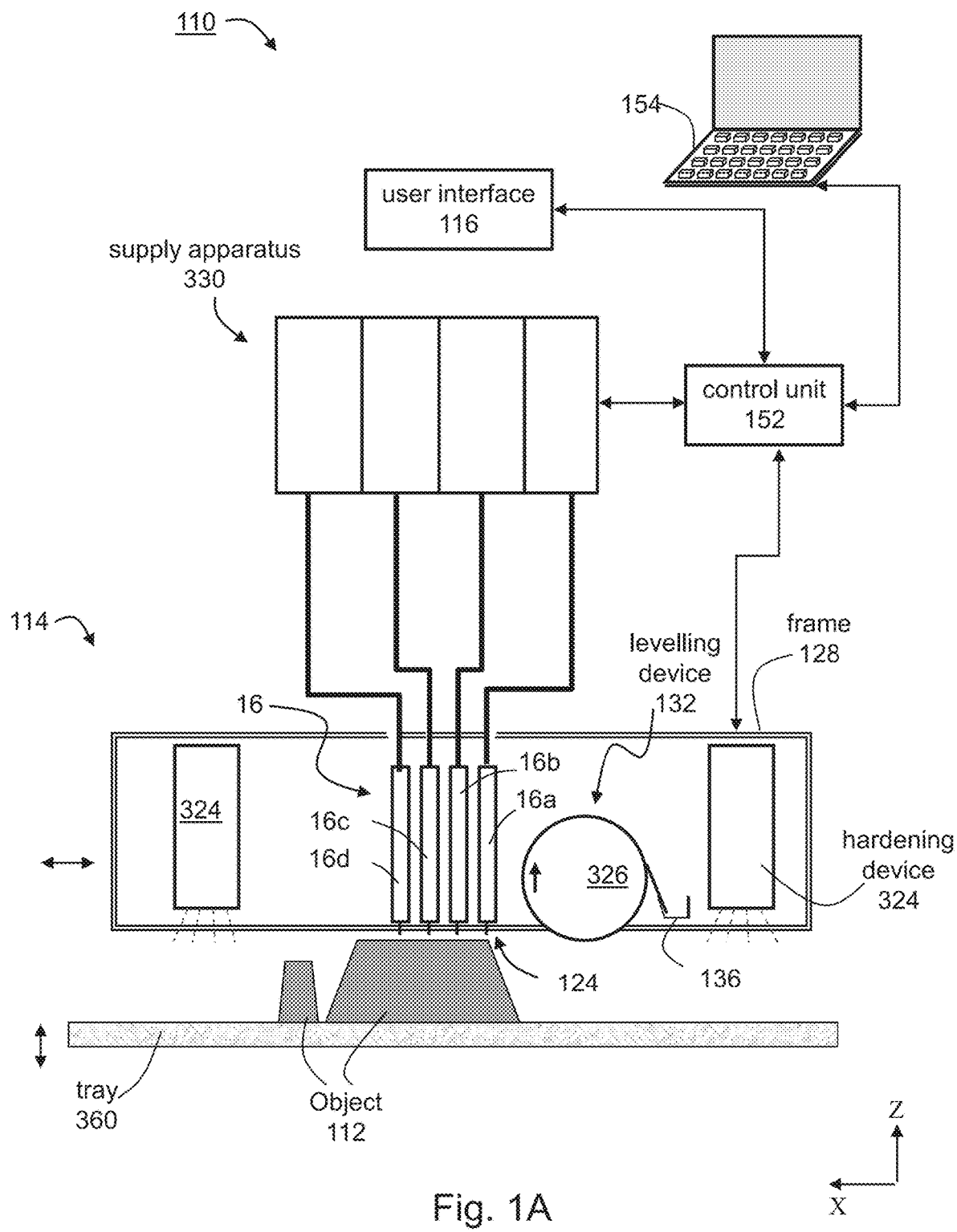

The present invention, in some embodiments thereof, relates to disposal of waste ink or resin during additive manufacture, and, more particularly, but not exclusively, to a way of enabling standard waste disposal to be safely used.

Unused resin is a hazardous material and must be disposed of using special waste disposal techniques, which typically become the responsibility of the resin provider. The 3D printing process generates a significant amount of waste, typically some ~10-30% of the volume jetted by the heads. Additional waste is also generated by head maintenance procedures such as purging and spitting.

While waste resin in liquid form is considered hazardous, cured resin is not hazardous and can be disposed of in the regular trash. The present embodiments thus cure the waste resin as it is generated. Once the waste resin cartridge is full the user simply throws the cartridge in the trash and replaces it with a new one.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM. The materials are optionally and preferably deposited in layers during the same pass of the printing heads. The materials and combination of materials within the layer are selected according to the desired properties of the object. A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-2C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ.

Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, α, is preferably selected to ensure that in each formed layer, the height of modeling material equals the height of support material. Typical values for α are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or the like that may cause the deposited material to hardened. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge. The waste collection is discussed in greater detail hereinbelow.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1D:
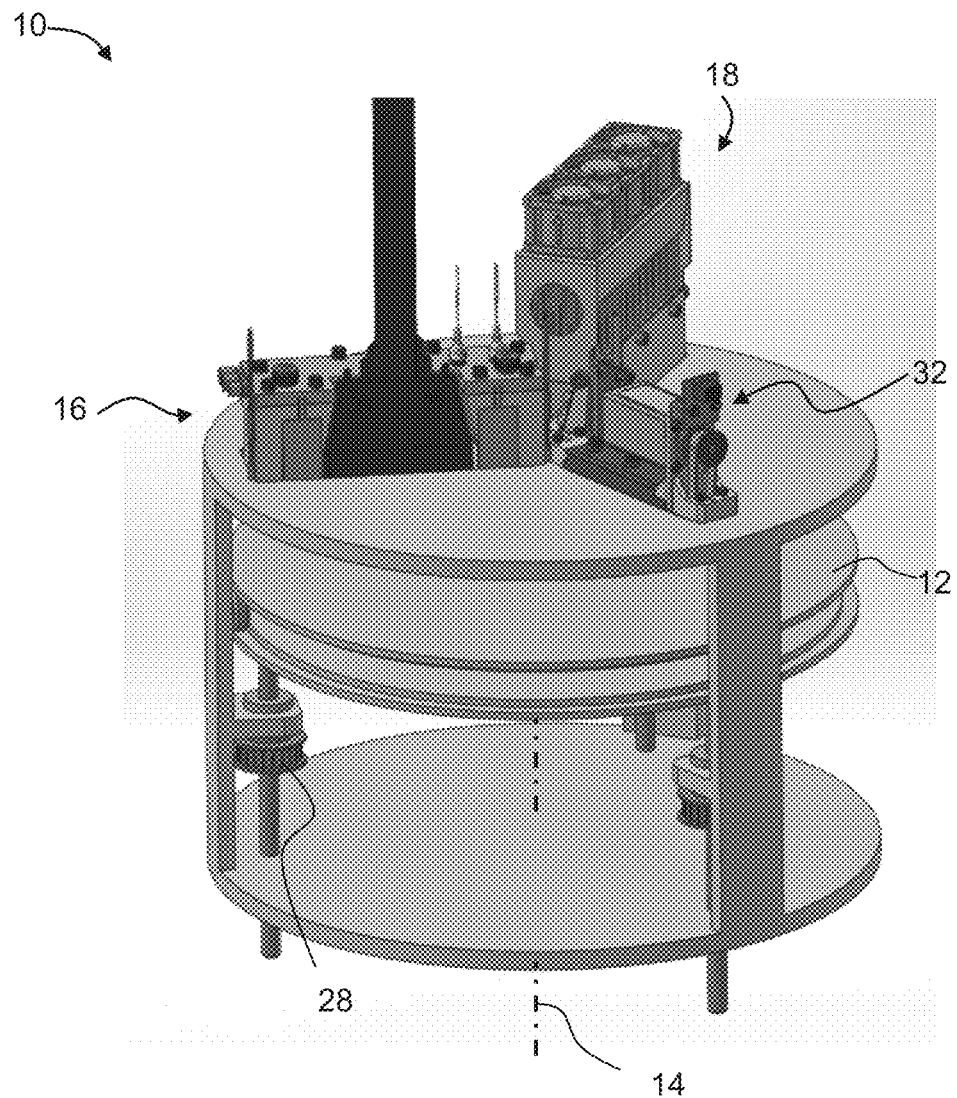

Another representative and non-limiting example of a system 10 suitable for AM of an object according to some embodiments of the present invention is illustrated in FIGS. 1B-1D. FIGS. 1B-1D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-2B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
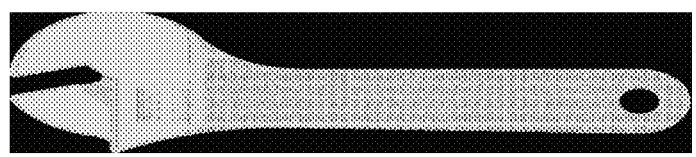
FIGS. 3A, 3B, 3C, 3D, 3E and 3F are schematic illustrations demonstrating coordinate transformations according to some embodiments of the present invention.
Figure 3B:
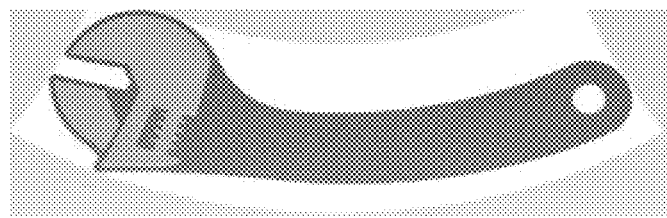
Figure 3C:
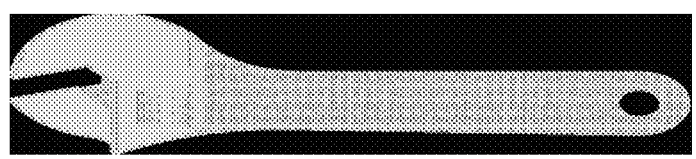
Figure 3D:
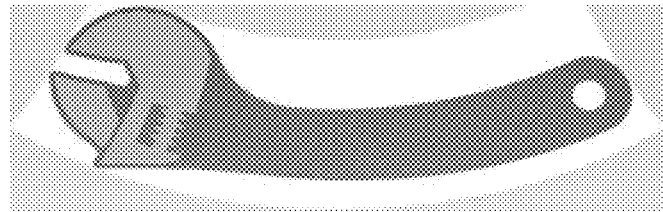
Figure 3E:
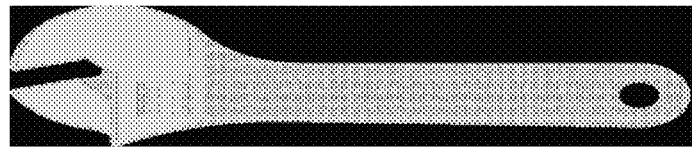
Figure 3F:
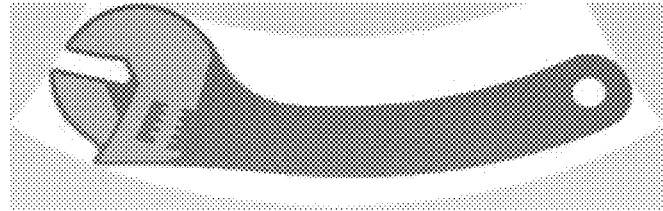

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-3F, showing three slices of an object (each slice corresponds to fabrication instructions of a different layer of the objects), where FIGS. 3A, 3C and 3E illustrate slices in a Cartesian system of coordinates and FIGS. 3B, 3D and 3F illustrate the same slices following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2$, $(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14).

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

Figure 4:
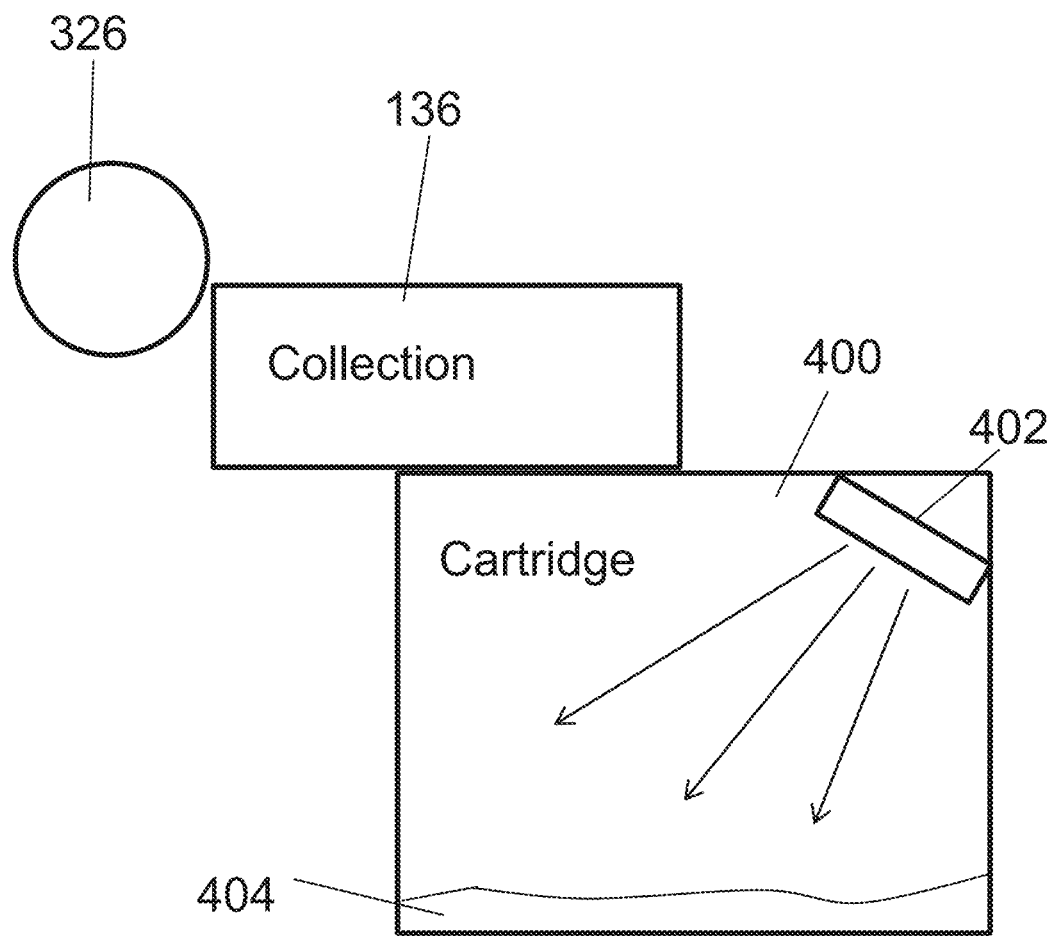
FIG. 4 is a simplified diagram showing an additive manufacturing apparatus with waste collection according to an embodiment of the present invention.

Reference is now made to FIG. 4, which is a simplified diagram illustrating the waste ink disposal sub-system of an additive manufacturing apparatus according to the present embodiments. As discussed above in respect of FIG. 1A, additive manufacturing apparatus 114 further comprises one or more leveling devices such as a roller 326. Leveling device 326 serves to straighten, level and/or establish a thickness of the newly formed layer prior to the formation of the successive layer thereon. Leveling device 326 preferably comprises a waste collection device 136 for collecting the excess resin material generated during leveling. Waste collection device 136 may comprise any mechanism that delivers the material to a waste tank or waste cartridge 400. A waste ink curing device 402, which may be built into the cartridge 400, includes an energy source such as a light emitting diode or one or more banks of light emitting diodes to cure the waste material or waste ink 404 after being collected in the cartridge 400.

Figures 5, 6:
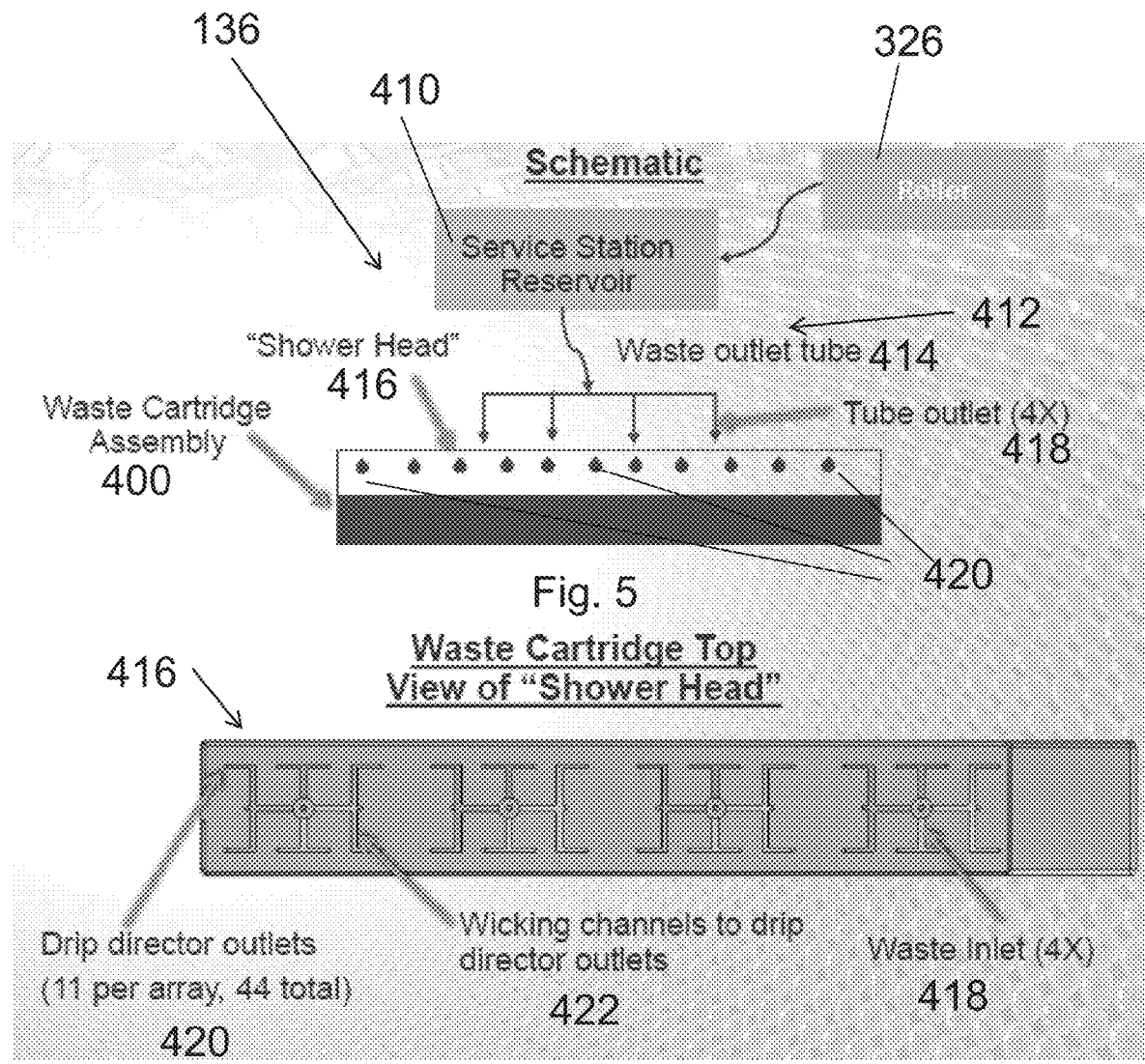
FIG. 5 is a simplified schematic diagram showing the path of waste ink or resin from the printing location to the collection cartridge according to an embodiment of the present invention.
FIG. 6 is a simplified schematic diagram showing a head part of a cartridge assembly according to an embodiment of the present invention.

Reference is now made to FIG. 5, which shows in greater detail the waste ink collecting device 136. The device is connected to roller 326 which may have an internal pump and includes a reservoir 410 which collects the waste ink from the roller 326. The reservoir may additionally collect waste ink from printing head servicing, such as periodic purging of the print heads. A tubing system 412 collects ink from the reservoir 410, typically using gravity to drain the waste ink from the reservoir into a drainage or waste outlet pipe 414 into the cartridge 400. A distribution head 416, having a shower head construction, distributes the waste ink from showerhead inlets 418 via wicking channels, to drip points 420 distributed evenly over the area of the collecting cartridge 400. The idea is to dispense waste ink evenly over the collecting surface of the cartridge, as will be explained in greater detail below.

Reference is now made to FIG. 6, which is a schematic view from above of the showerhead construction of the distribution head 416. Each of four inlets 418 from waste pipe 414 leads to a series of wicking channels 422 and then to 11 drip points or drip director outlets 420. The idea of the drip points is to distribute the waste output evenly through the cartridge. The drip points are arranged as a distributed array for even distribution of the waste ink over the floor of the waste collecting cartridge.

Figure 7:
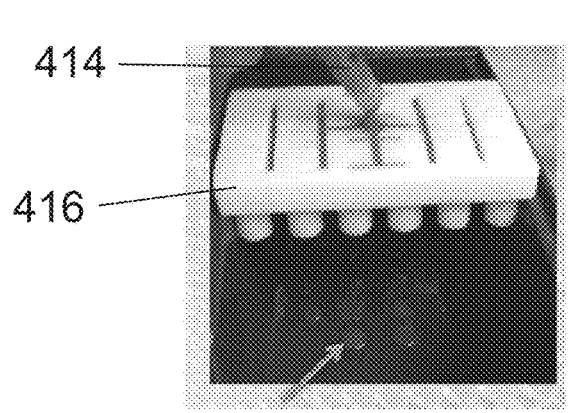
FIGS. 7 and 8 are photographs of a collection cartridge according to an embodiment of the present invention in which waste ink is shown in two different stages of coalescing.
Figure 8:
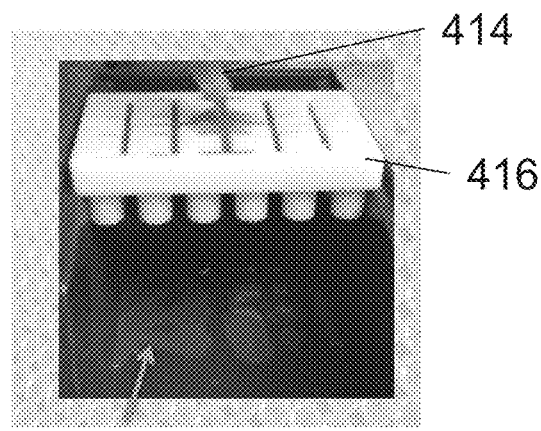

Reference is now made to FIGS. 7 and 8 which show successive stages in waste ink 404 distributed over the floor of a cartridge 400. In FIG. 7 distinct drops are apparent, but in FIG. 8 more ink has arrived and the drops have coalesced. In the present embodiments, the drops are given time to coalesce before carrying out curing. That is to say the curing energy source is operated only after time has been allowed for the ink to be evenly distributed in the cartridge. The operation of the curing device may for example be set according to a flow rate of the waste ink. The faster the flow rate the sooner or more often curing is carried out. Failure to allow drops to coalesce before carrying out curing may lead to the formation of stalagmites, as discussed below.

Figure 9:
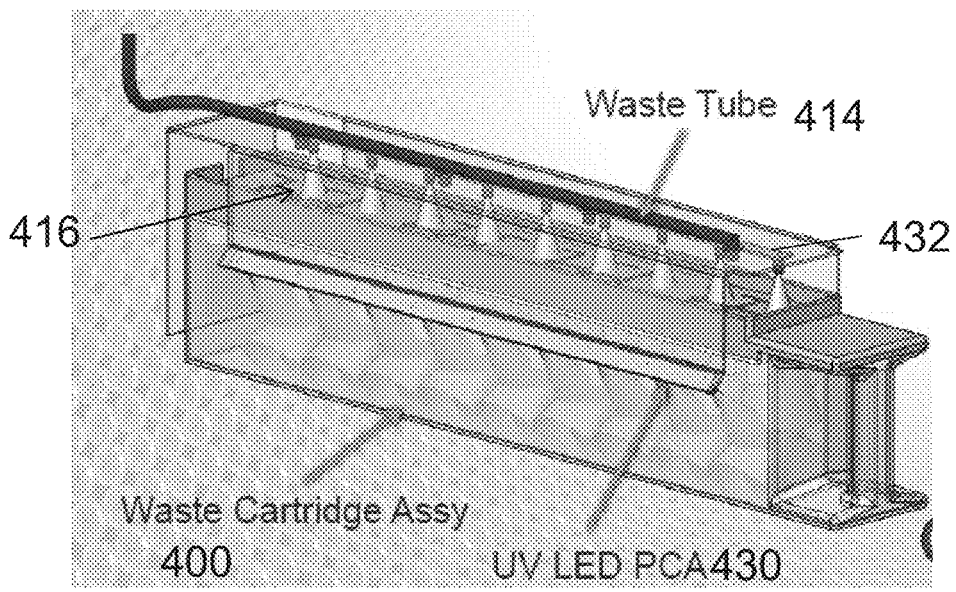
FIG. 9 is a simplified diagram showing a side cutaway view of a waste ink collecting cartridge according to an embodiment of the present invention and illustrating the locations for curing LEDs.

Reference is now made to FIG. 9, which is a simplified diagram of the cartridge 400 showing the curing energy source as banks of mountings of ultra violet light emitting diodes (LED). The banks are set up to radiate evenly over the waste ink in the cartridge so that all of the ink is cured and there are no shadows where puddles of liquid may be left. In the present embodiment, three banks are provided. A first bank 430 is located lengthwise along cartridge 400 towards one side. A second bank is obscured by the shower head but is located lengthwise on a second side of the cartridge opposite bank 430. Both banks are set at an oblique angle and a third bank 432 is located lengthwise in the distribution head above the exit points. The third bank 432 carries out a curing operation when the cartridge 400 is full, to cure the ink left in the distribution head 416, the undripped ink, so as to ensure that no hazardous liquid resin remains anywhere in the cartridge during disposal.

Figure 10:
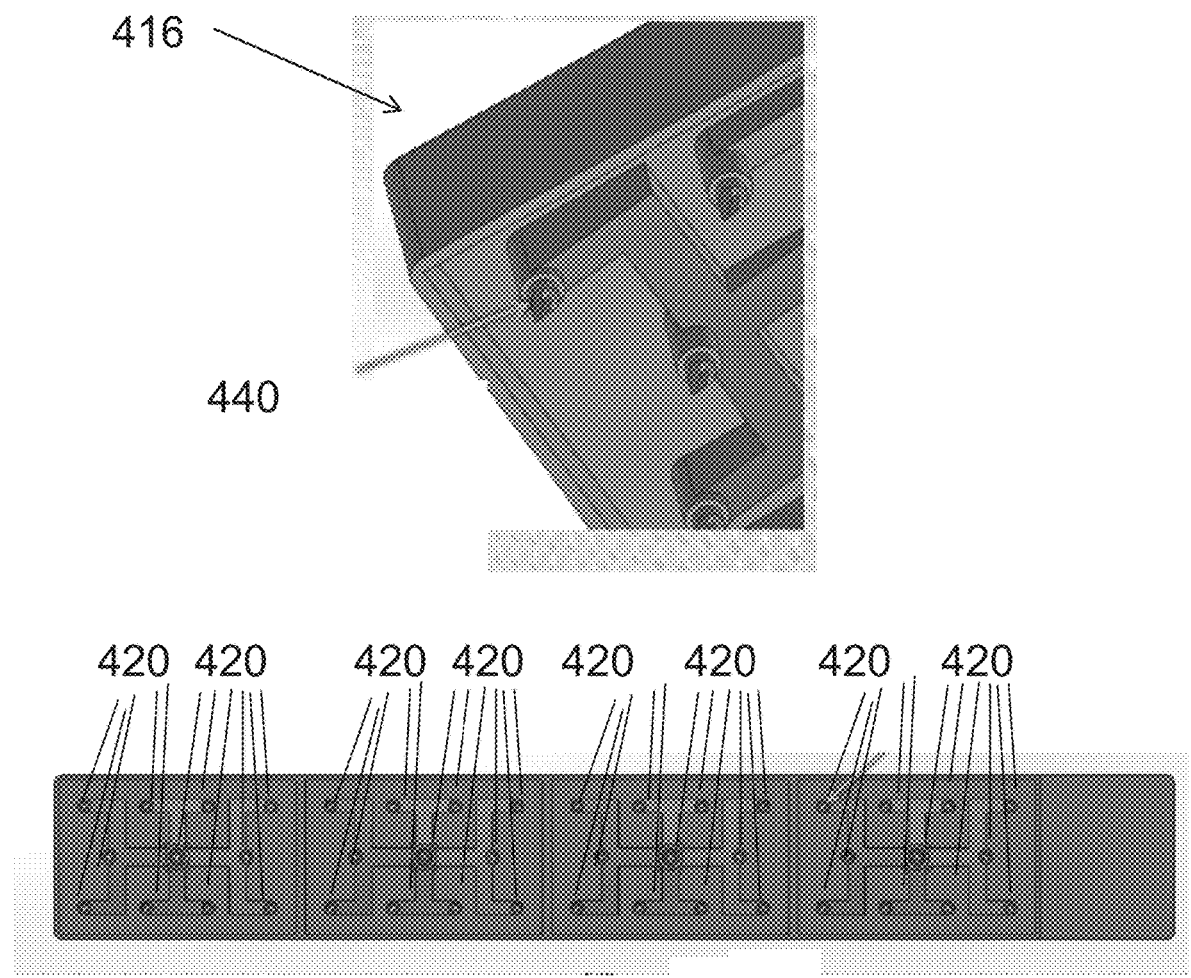
FIG. 10 illustrates a construction and location for dripping points in a shower head of a collecting cartridge according to an embodiment of the present invention.

Reference is now made to FIG. 10, which is a simplified schematic diagram that illustrates shielding 440 which may be located around each of the drip points 420 at the bottom of the distribution head 416. The shielding is provided to protect the drip points from curing energy from the LEDs. Cured ink at the drip points would otherwise block the drip points or may lead to the formation of stalactites, as will be discussed in greater detail below. The shielding may protect against direct irradiation and may also protect against reflected irradiation from most directions. Straight line specular reflection from the waste ink surface to the drip points cannot be protected against but the total energy in such reflections is not sufficient to cause effective curing. That is to say, direct vertical rays are minimal and are caused only by specular reflection off the ink at the bottom of the cartridge. As discussed, the LED banks are pointed at an oblique angle to the floor, thus preventing any direct reflection reaching the drip exit points.

Figure 11:
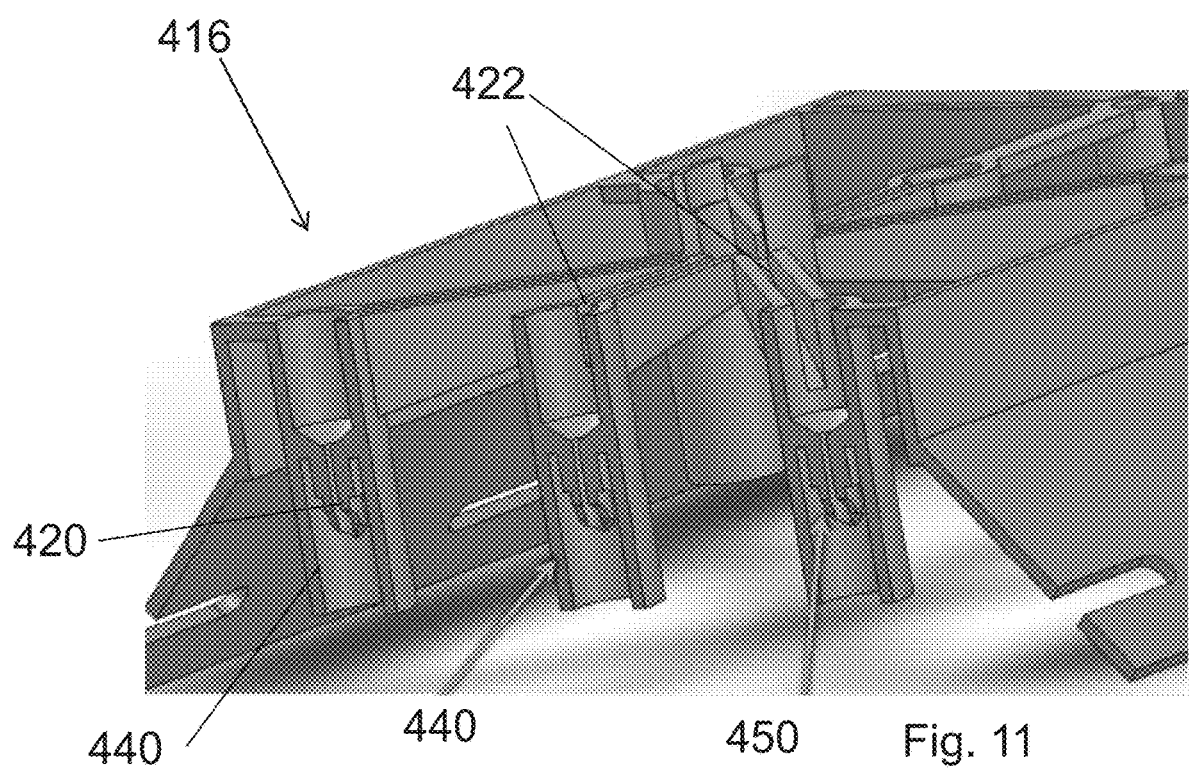
FIG. 11 is a simplified diagram showing a cutaway view of drip exit points in a showerhead according to an embodiment of the present invention.

The shielding may be in the form of hoods or cylindrical extensions that surround each drip point, extending downwardly. FIG. 11 shows cutaway drawings of the wicking channels 422, the drip points 420 and the shielding 440.

Reference is now made to FIGS. 12A, 12B and 12C, which are a schematic lengthwise cross section of cartridge 400, a schematic widthwise cross-section of the cartridge and a schematic view from below of the shield array, respectively. FIG. 12A shows the shower head or drip array 416 which is made of opaque plastic and the cartridge body wall 460 which may be made of clear plastic. The shielding 440 is of opaque plastic. In FIG. 12B it is seen that the drip points 420 are in fact pointed terminations on which drips form and grow. A shovel 450 may be provided below each drip point within the shielding to direct dripping. The drips fall onto the shovel and then exit via larger openings which are less susceptible to clogging by stray UV light. In FIG. 12C the drip points are shown with shielding around and shovels below each drip point.

The drip director geometry is designed to avoid the formation of stalactites at the drip points. Thus if drip points are exposed, stalactites may form from the drip directors. Drip director designs which shield drops from UV exposure until they drop off of the drip directors do not exhibit this behaviour.

Figure 13A:
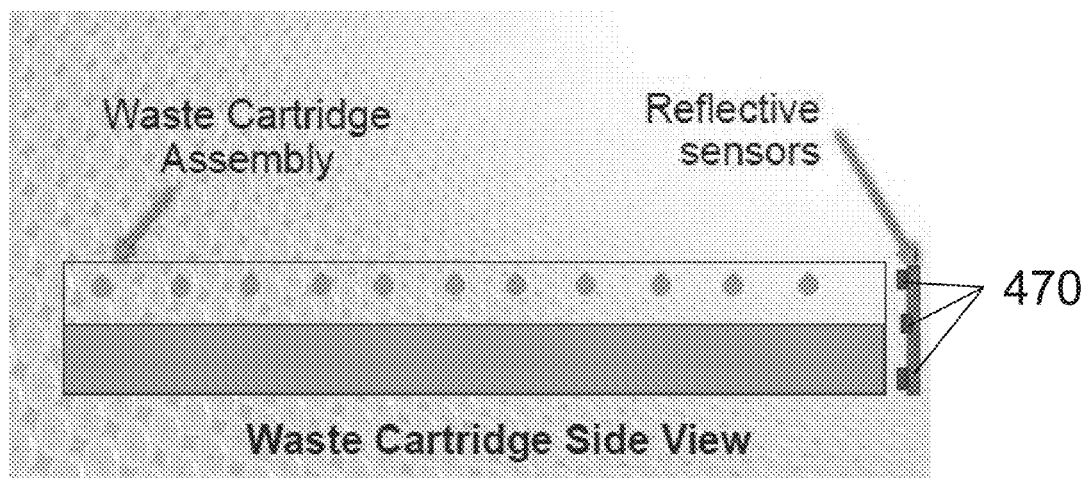
FIGS. 13A and 13B are two side sections of a level detector for a collecting cartridge according to an embodiment of the present invention.
Figure 13B:
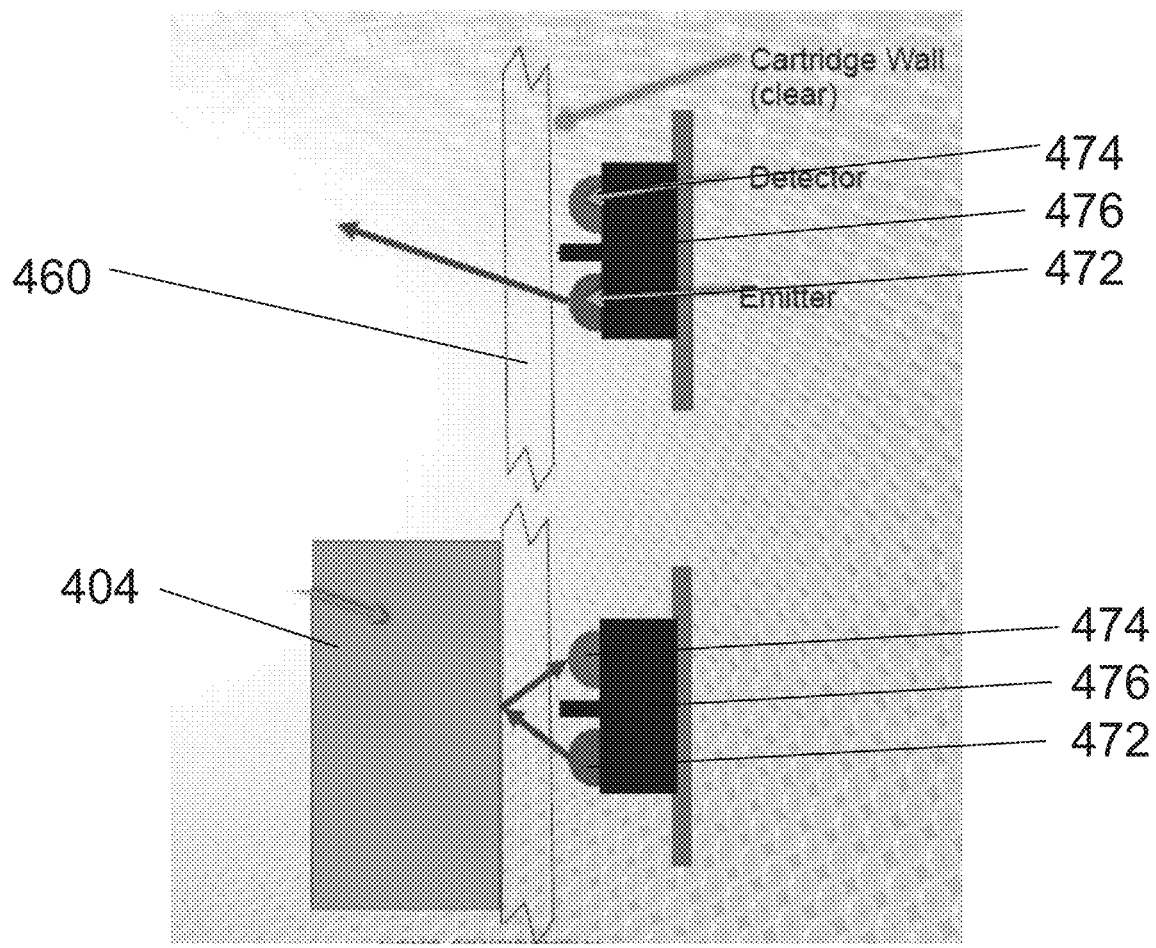

Reference is now made to FIGS. 13A and 13B, which are side schematic views of a level detector 470 to detect whether cartridge 400 is full or not. The level detector 470 comprises an emitter 472 and a detector 474, separated by an opaque spacer bar 476 and located outside transparent cartridge wall 460. In the example shown in FIG. 13A there are three such level sensors and in FIG. 13B the upper image shows that in the absence of waste, light from the emitter is not reflected onto the detector. In the lower image, waste material reflects the beam from the emitter so that it is picked up at the detector, and the cartridge is thus able to determine how full it is and when it needs to be changed.

A full cartridge is detected by the level detector 470 at the rear of the unit.

Upon detecting that the cartridge is full, printing is paused and the remaining waste is allowed to flow into the cartridge. A final pulse of UV light is provided by the side mounted LED strips 430 to cure the last of the waste in the main chamber of the cartridge. The 3$^{rd}$ LED strip 432, located on top of the Shower Head assembly (see FIG. 9) then cures any material remaining in the wicking channels.

The cartridge may now be safely removed and disposed of by the user, and after installing a new waste cartridge, printing resumes.

Figure 14:
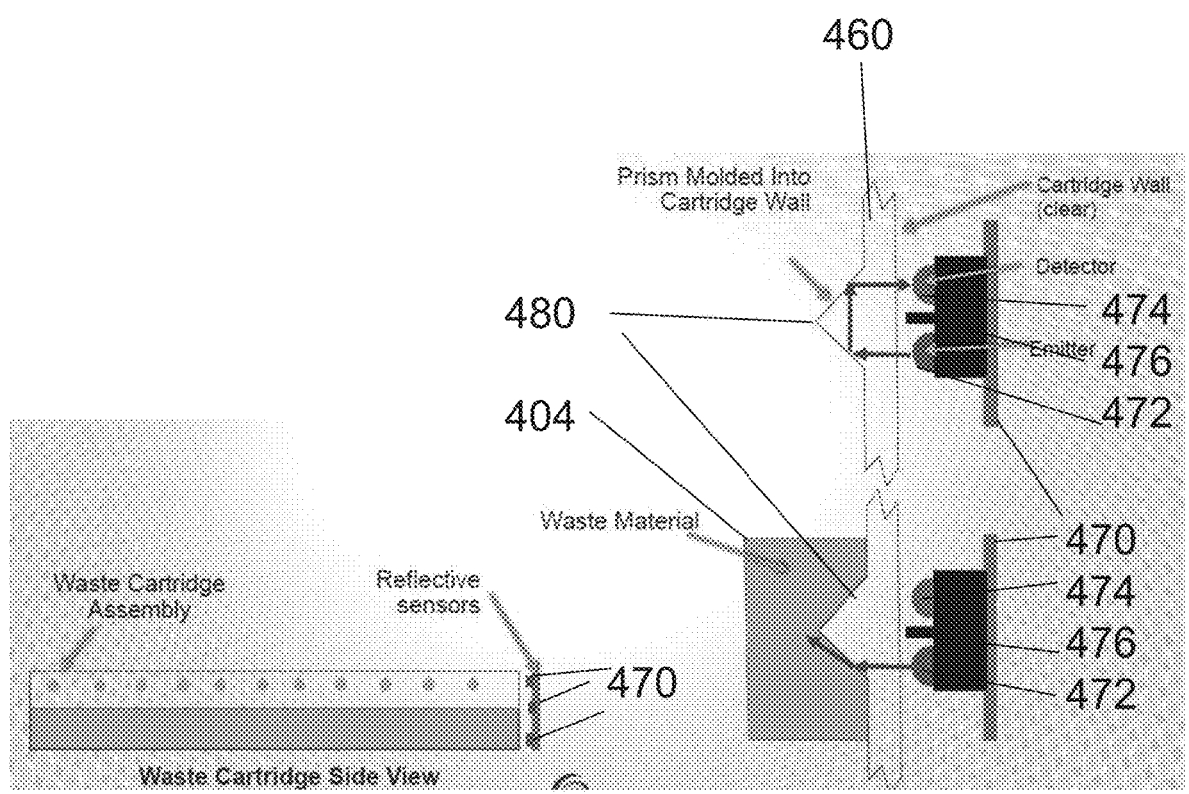
FIG. 14 is an alternative embodiment of a level detector for a collecting cartridge according to the present invention.

Reference is now made to FIG. 14, which shows a variation of the level detector 470 in which prism 480 is moulded into transparent cartridge wall 460. The prism is designed with a refractive index that causes total internal reflection when the cartridge is empty but fails to reflect when the cartridge is full. An advantage of the prism embodiment over that of FIGS. 13A and 13B is that the default position is that light is detected.

Figure 15:
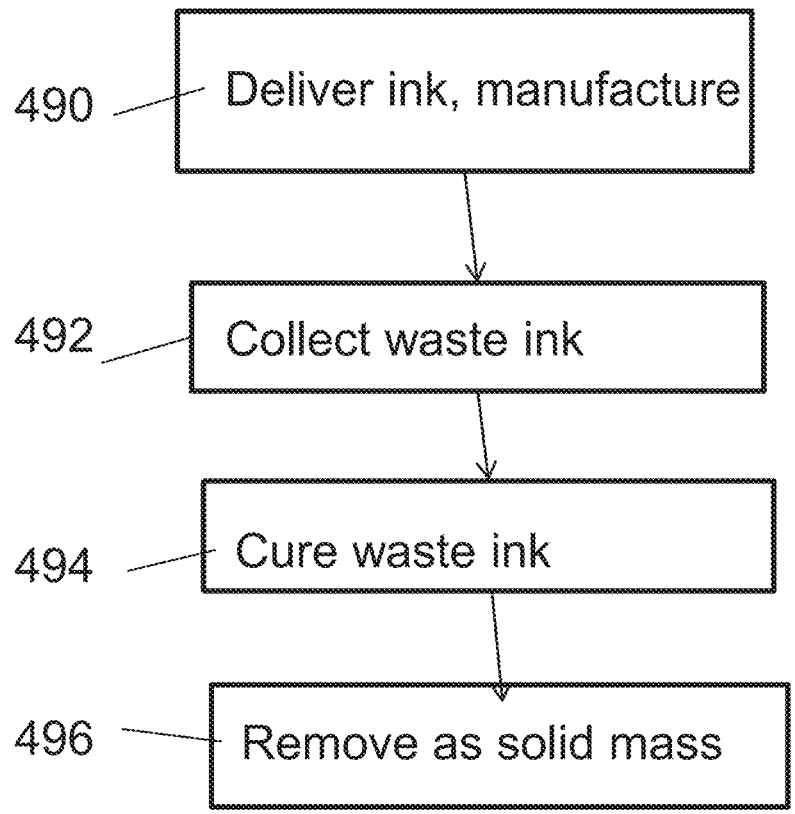
FIG. 15 is a flow chart showing operation of the collecting and curing process for waste ink according to an embodiment of the present invention.

Reference is now made to FIG. 15, which illustrates a method for waste ink management during additive manufacturing. Manufacturing takes place 490 and the waste ink is removed and collected 492. After collection the waste ink is cured 494, and then removed 496 as a solid mass for disposal.

Figure 16:
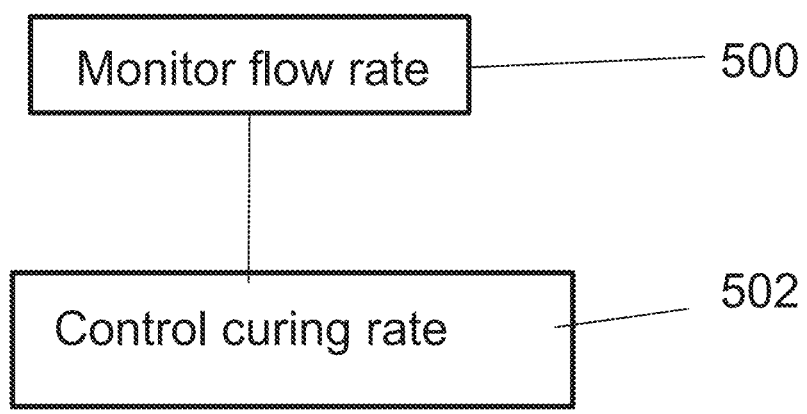
FIG. 16 is a simplified flow chart showing monitoring of waste ink flow rate and using of the result to control the curing rate or dosage, according to an embodiment of the present invention.

Reference is now made to FIG. 16 which is a simplified flow chart illustrating a method of controlling the curing according to an embodiment of the present invention. The flow rate of the waste may be monitored or estimated 500 and the curing may be carried out at intervals which are longer for lower flow rate and shorter for higher flow rate. In addition the curing energy source may be restricted to operation when the ink drops have had enough time to be evenly distributed, that is to say enough time for droplets to grow and merge.

Matching timing and dosage, meaning the amount of curing, to flow rate, prevents formation of stalagmites. If the dosage is too high stalagmites form, since the resin does not have time to spread out before being cured. On the other hand, if the dosage is too low, pools can form. If the pools are too deep, the UV can cure a layer on top of the pool, trapping liquid resin underneath. If this happens, the trapped liquid can never be cured because the cured layer on top of it blocks the UV.

A test was carried out using a peristaltic pump with a servo controller. Two eight watt UV LED light strips were used to carry out the curing and attached to a cycle timer. Timing was based on a maximum waste flow rate of 14 ml/minute, and a mixture of Objet VeroBlack resin with FC705 support resin in a 50-50 mix (both of Stratasys Ltd., Israel).

Uncured resin may leak from pockets in the stored waste, making the waste hazardous.

Figure 17:
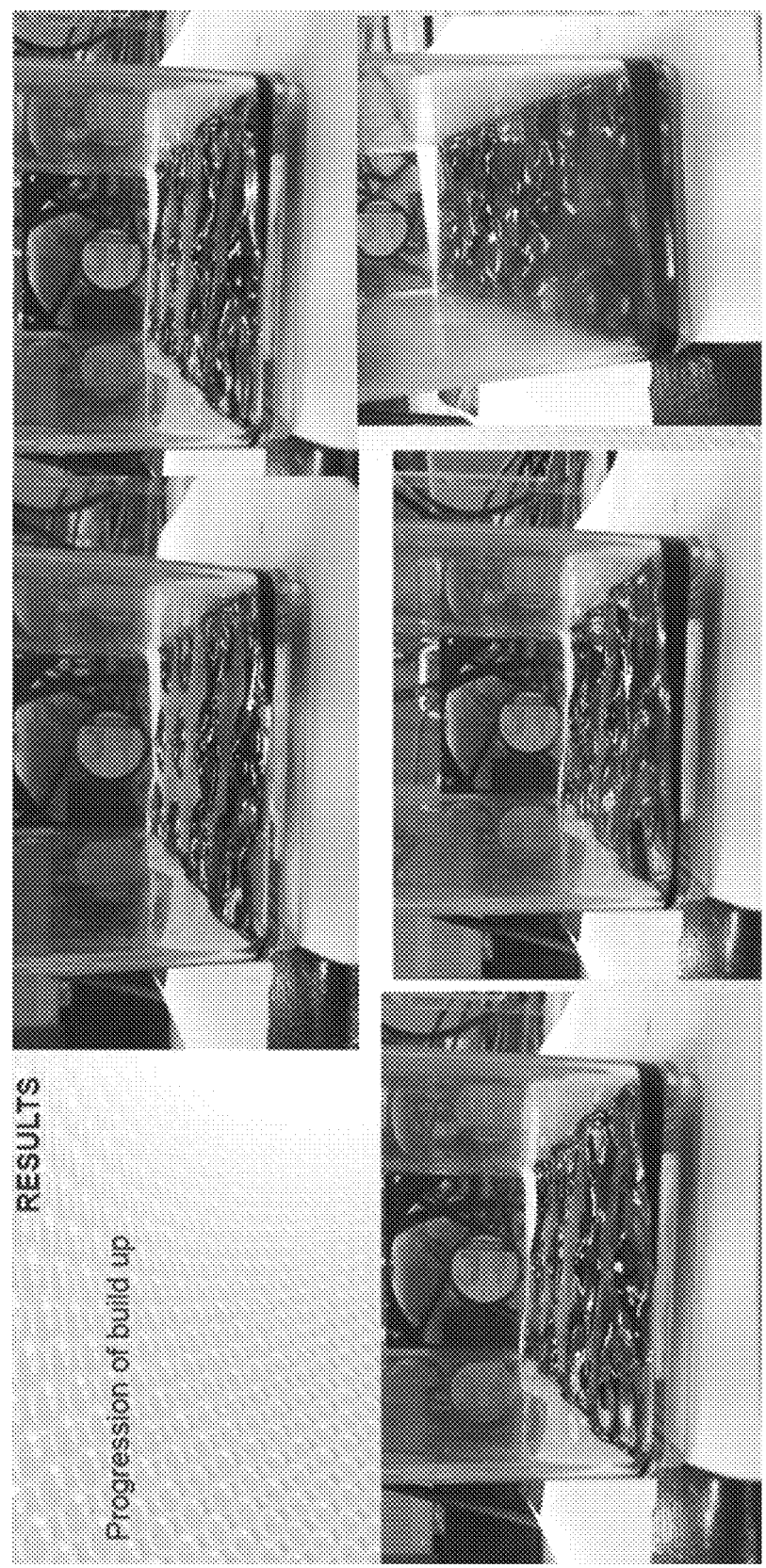
FIG. 17 is a photograph illustrating various stages of buildup of resin or ink in the collecting cartridge during operation of the present invention.

Reference is now made to FIG. 17, which shows five successive stages in the build up of waste resin in the cartridge. It can be seen that the resin builds up in essentially flat layers.

Figure 18:
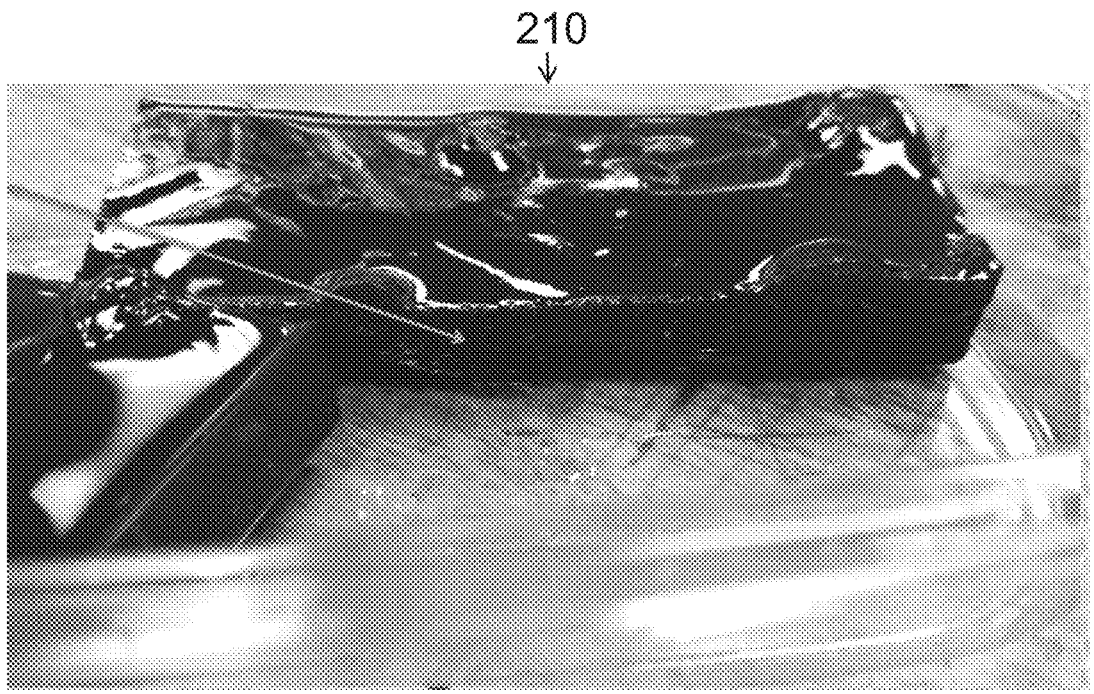
FIG. 18 is a photograph illustrating layering structure in the cured waste resin.

FIG. 18 shows cured waste 210 removed from a cartridge. Edge 212 evinces evidence of layering.

Figure 19:
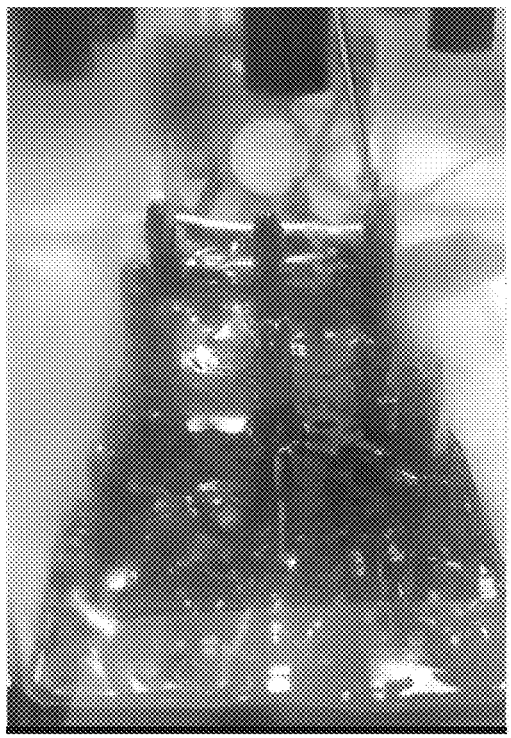
FIG. 19 is a photograph illustrating buildup of stalagmites.

Reference is now made to FIG. 19, which illustrates the formation of stalagmites 220. Stalagmites form when the curing dosage is too high and the waste is cured before it has a chance to spread out. Too low a dosage leaves pools of uncured resin which become buried under cured resin and which thus cannot subsequently be cured.

Figure 20:
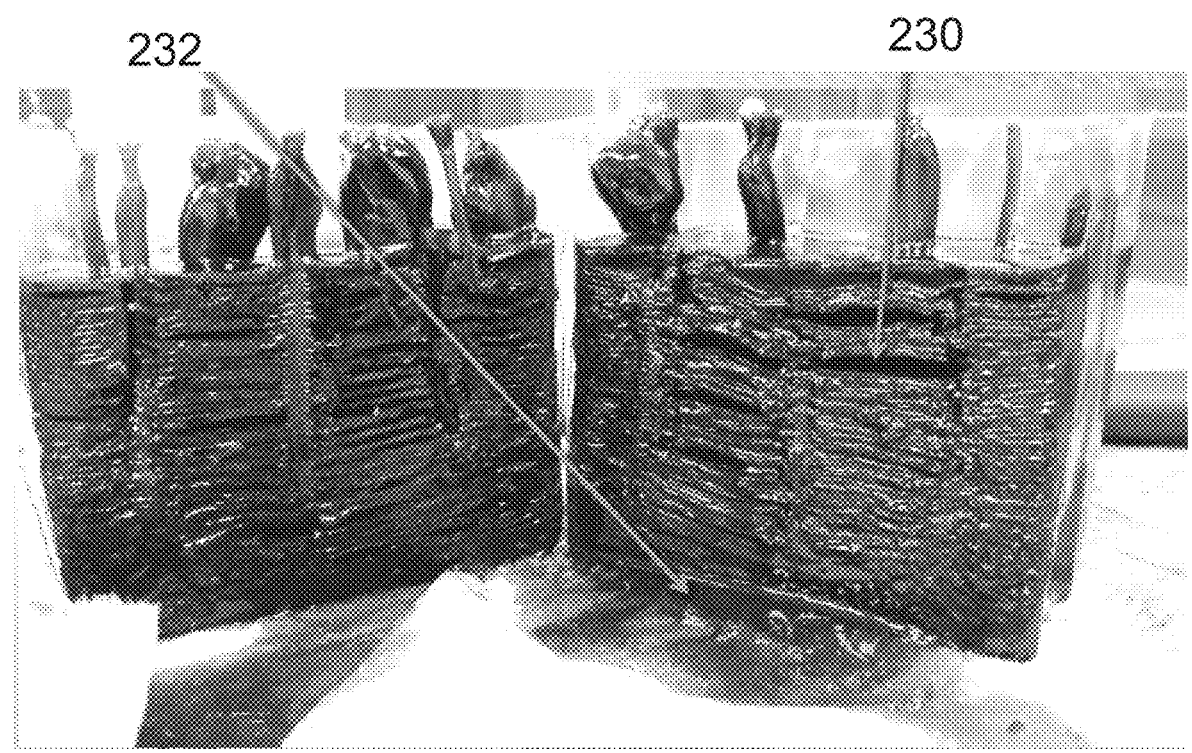
FIG. 20 is a photograph illustrating uncured pockets of liquid resin within the generally cured mass.

Reference is now made to FIG. 20 which illustrates what happens when the dosage is too low. Waste resin is cut in two and pockets 230 are seen to have formed. The pockets contain uncured resin which leaks into pool 232.

Figure 21:
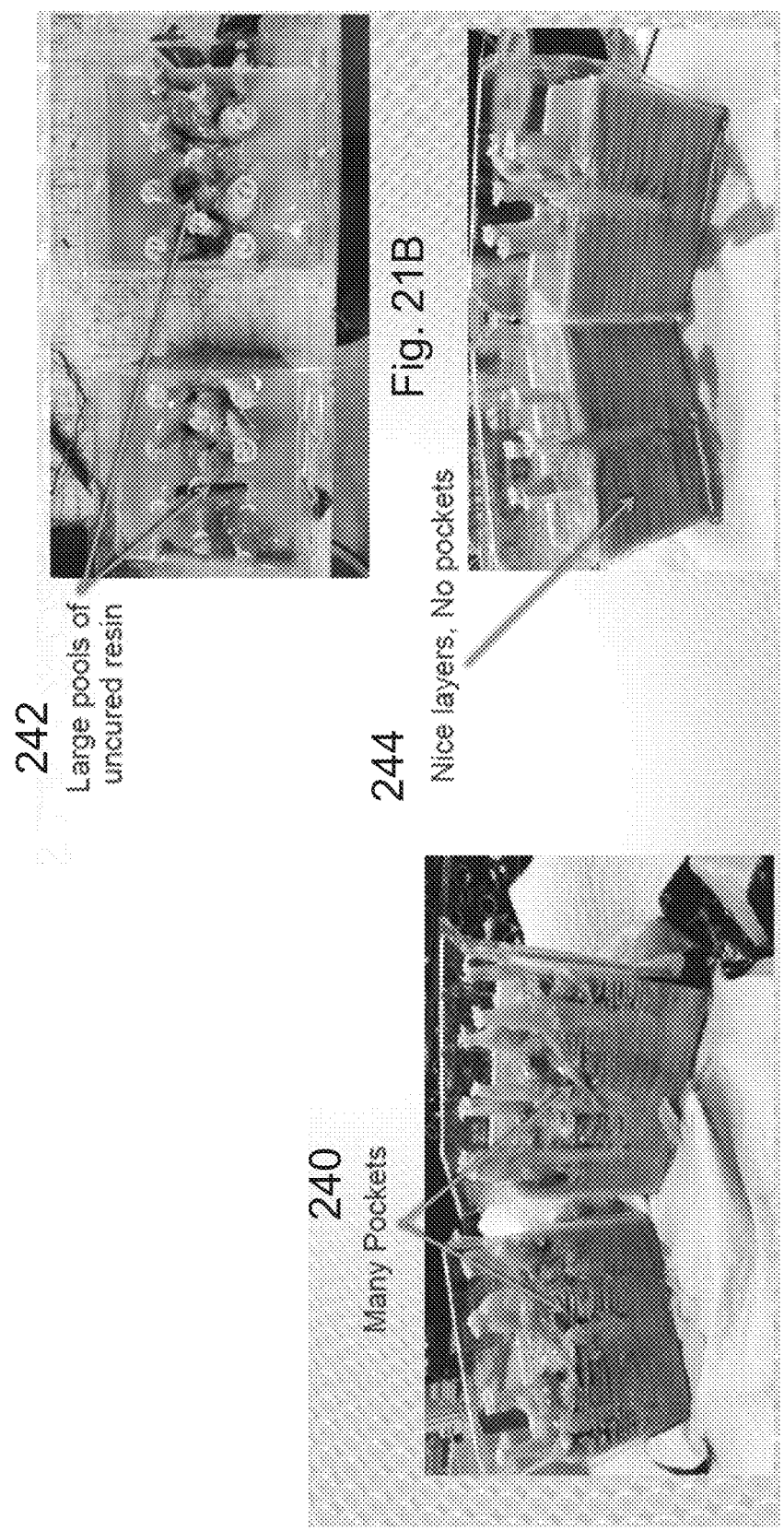
FIGS. 21A, 21B and 21C are photographs illustrating how buildup of stalagmites causes pockets of liquid resin to form in the resulting shadows.

Reference is now made to FIGS. 21A-21C. The existence of stalactites and stalagmites additionally cause shadowing, blocking the UV from certain areas and generally causing those areas to obtain too low a curing dose. The result is numerous pockets of uncured resin. FIG. 21A shows a section through a shadowed area, where many such pockets 240 can be seen. FIG. 21B shows pools 242 of uncured resin appearing behind stalagmites, and FIG. 21C by contrast shows a section through an unshadowed area, where good layering 244 is seen and there are no liquid pockets.

Figure 22:
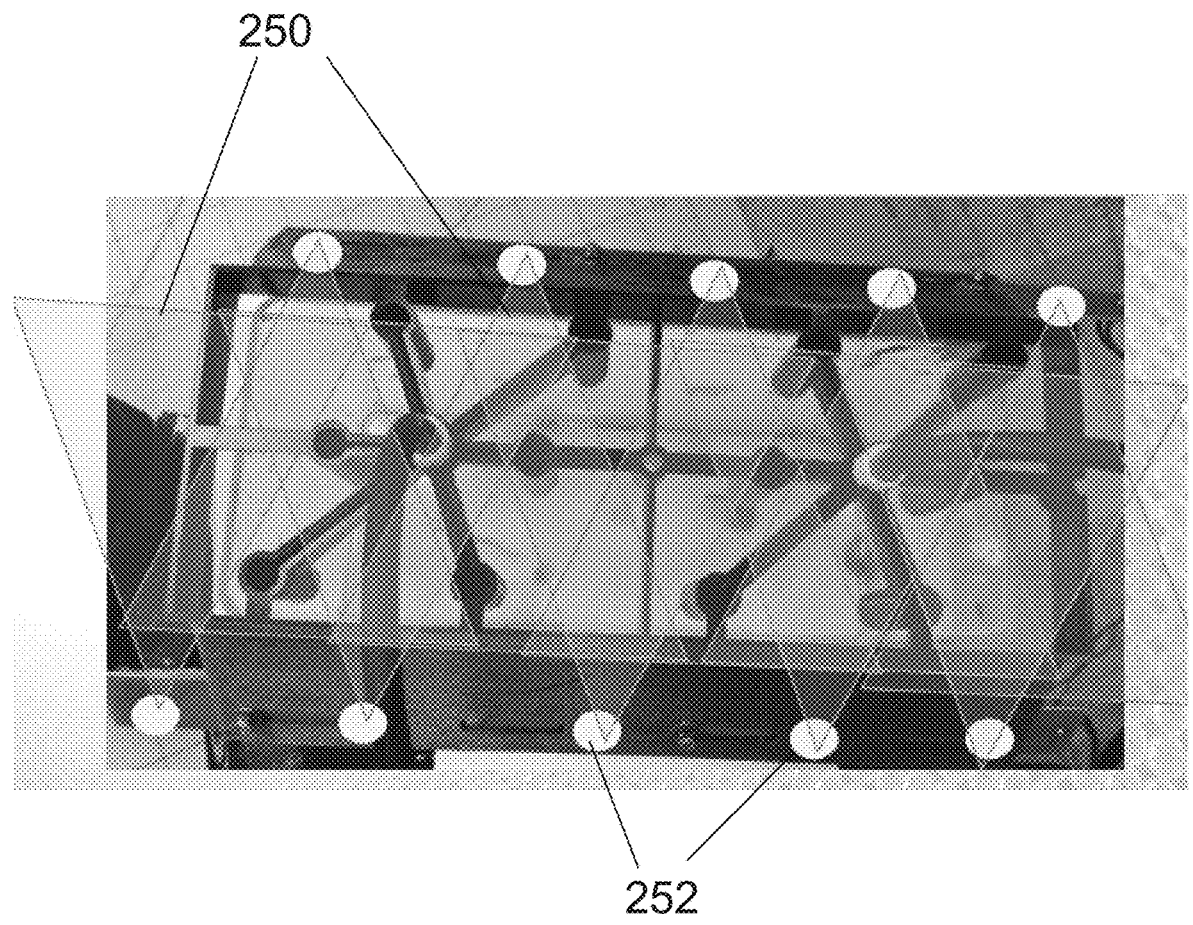
FIG. 22 is a photograph showing LED locations and using triangles to show how curing light covers the interior of the cartridge with illumination from at least two points according to an embodiment of the present invention.

Reference is now made to FIG. 22 which uses triangles 250 to illustrate illumination patterns from lighting points 252 illustrated symbolically by yellow circles. Arrangement of the drip directors and LEDS so that every drip point receives direct radiation from both sides ensures, if shadow causing features do form, no points are in full shadow from both sides.

More generally, a combination of good drip director design, flow rate matched UV timing and LED/drip director arrangement can prevent the issues associated with shadows. Drip director design and UV timing prevent formation of stalactites and stalagmites and thus may prevent or reduce shadow formation. The design may also ensure that drip points at least are irradiated from at least two sources, thus to mitigate the problems when shadow-causing features do in fact form.

Figure 23:
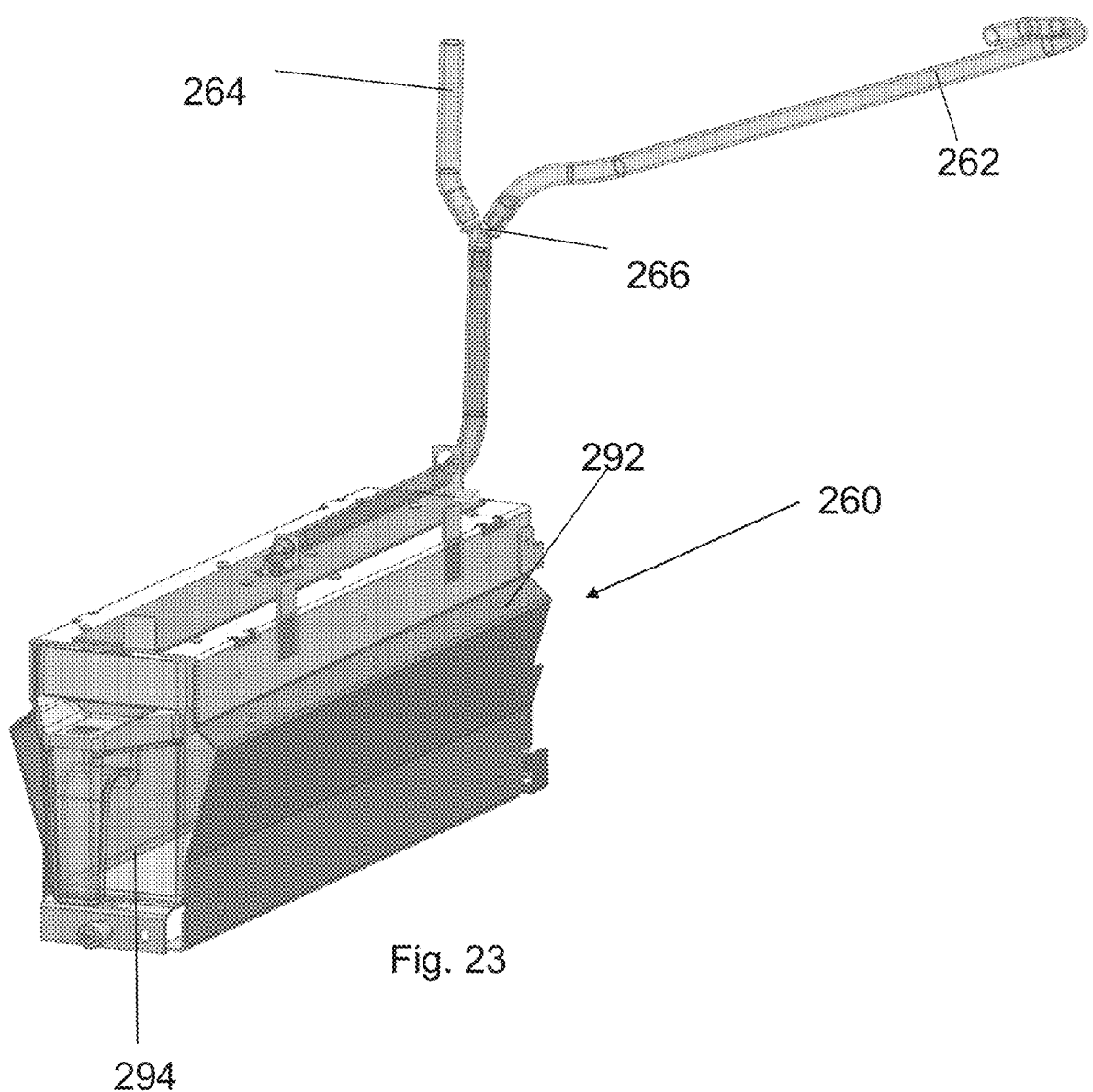
FIG. 23 is a simplified diagram illustrating a waste disposal system for a 3D printer according to a further embodiment of the present invention.

Reference is now made to FIG. 23, which shows an assembled view 260 of one embodiment of the waste disposal system. As with the previous embodiments the system has certain functions including:

1) transporting waste resin and distributing the resin evenly in the Waste Cartridge;

2) curing the waste resin as it is generated; and 3) carrying out a final curing process after the cartridge is full to ensure that all the waste ink is cured and thus chemically safe prior to disposal of the full cartridge.

Figure 24:
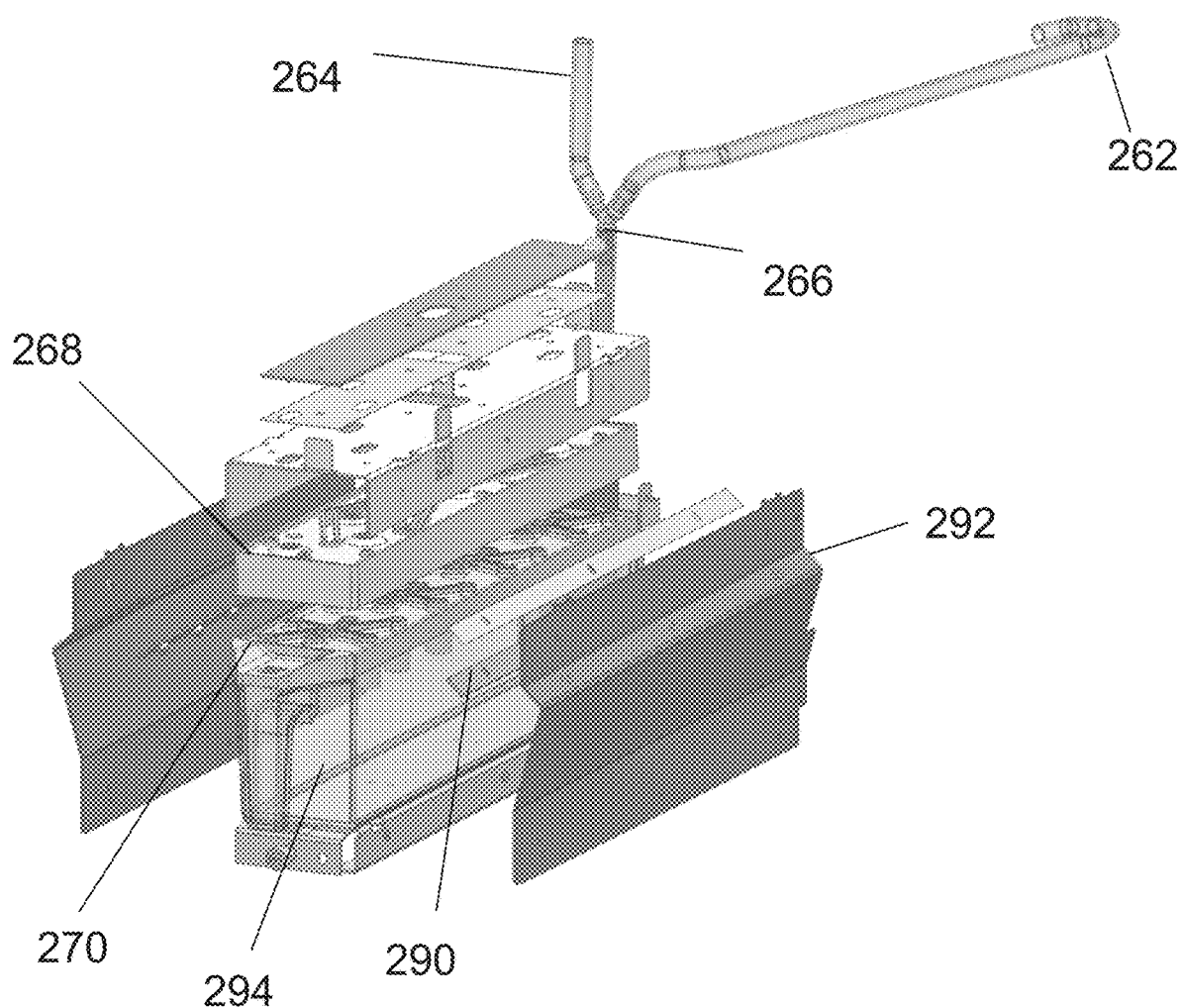
FIG. 24 is an exploded diagram of the system of FIG. 23.

Waste resin is generated in two locations, the service station which runs head maintenance procedures and the roller. Waste from these locations is transported to the waste curing system via a plumping set consisting of tubes and fittings. Longer pipe 262 obtains waste from the roller and shorter pipe 264 obtains waste from the service station. The plumbing set combines the waste resin streams coming from the roller and service station at junction 266 between the two pipes and delivers the streams to a single inlet of waste diverter 268—see exploded diagram on FIG. 24. This transport is motivated typically by gravity. However, in some embodiments of the invention, transport of the waste material in the plumbing set may be controlled by one or more mechanical devices such as peristaltic pumps.

Figure 25:
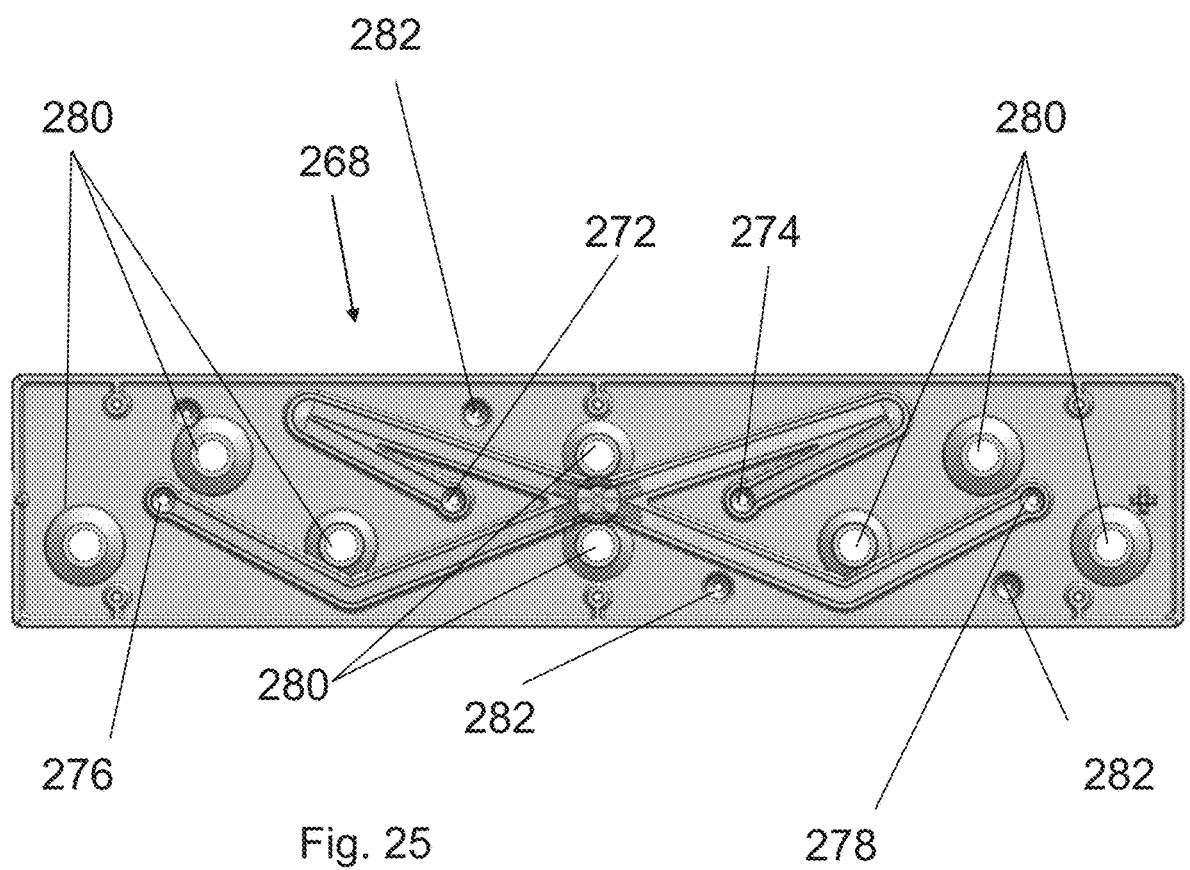
FIG. 25 is a simplified diagram showing a waste director component of the system of FIG. 23.

From this point on, even distribution of the waste material into the container of the cartridge is handled by waste diverter 268 and shower head 270 components. Referring to FIG. 25, waste diverter 268 splits the stream in to four equally spaced drip points 272, 274, 276 and 278. These drip points align with the four inlets of shower head 270 and the passage to each drip point is of identical length. In the example illustrated the result is achieved by using looped channels to the nearer drip points 272 and 274 by contrast with straighter channels to the more distant drip points 276 and 278. The fact that the distances are the same helps to ensure that the hydraulic pressure is the same in all paths. The paths may be placed at the same height, again to ensure that no path is preferential and the resin flow is as even as possible.

Large openings 280 allow for insertion of LED lamps for curing waste material remaining in shower head 270 and for sealing the waste cartridge before disposal in standard trashes. The distribution of the lamps is such as to ensure curing of all the remaining material present in shower head 270 before disposal of the cartridge. Security openings 282 are located above at least some of the drip points of shower head 270 to help evacuating the waste material from waste diverter 268 in case of waste overflow.

Figure 26A:
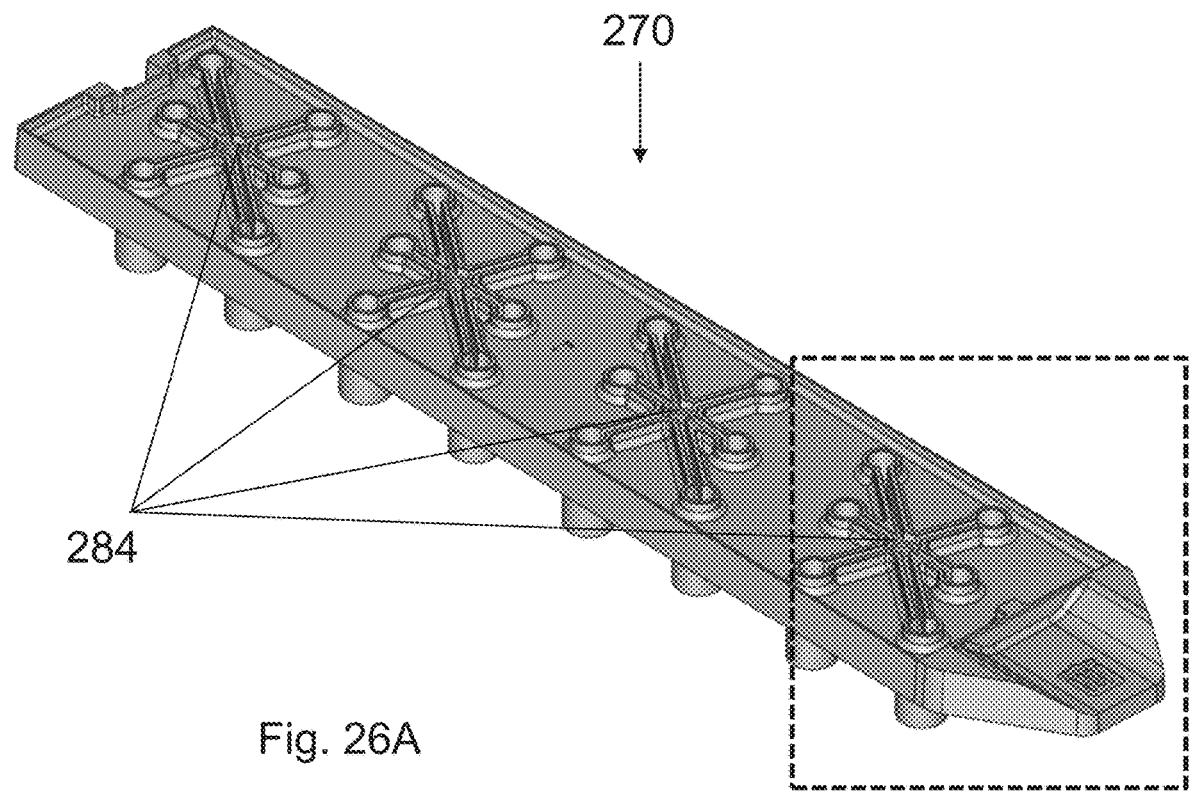
FIG. 26A shows a shower head component of the system of FIG. 23.

Reference is now made to FIG. 26A which is a simplified view of shower head 270. Shower head 270 matches with the four drip points of waste diverter 268 and divides each of the four streams into six new drip points of a cross with diagonal pattern 284 to create twenty four drip points in total. The twenty four drip points ensure even distribution of the resin in the cartridge as the shower head's drip points are evenly spaced in the plan view of the cartridge. Thus the resin is evenly deposited as it drops into the container portion of the waste cartridge. As the curing LEDs are only fired intermittently, the waste has time to find its level and coalesce into a relatively even layer between cure cycles. Transport through both waste diverter 268 and shower head is caused by a combination of gravity and wicking. However, in some embodiments of the invention, transport of the waste material in the waste diverter and/or the shower head may be controlled by one or more mechanical devices such as peristaltic pumps.

Figure 26B:
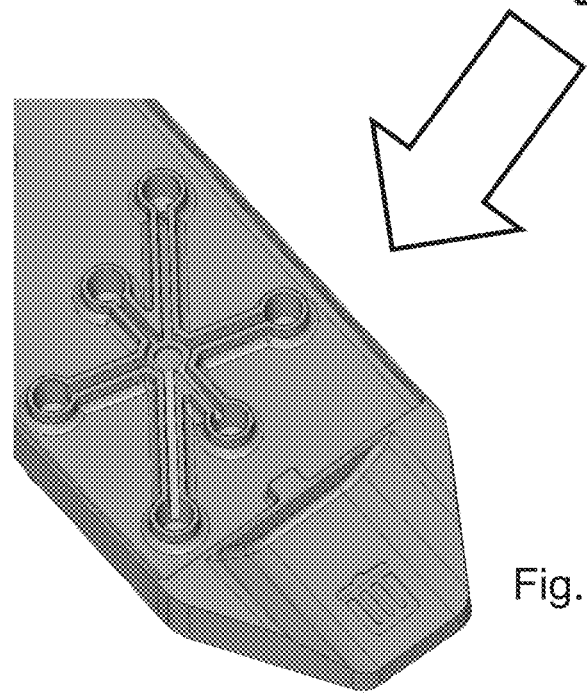
FIG. 26B is a detail of a part of the component of FIG. 26A.

FIG. 26B shows a detail of the cross and diagonal pattern 284. The shower head illustrates the use of corner radii to encourage or discourage wicking. Resin is specifically designed to wick into the small confines of print head firing chambers. This helps the print heads to prime and stay primed. Unsurprisingly, aggressive wicking behaviour from the resin occurs outside of the print head as well. As wicking action happens best in tight corners with small or no radius, sharp corners are implemented in places where we would like the resin to go or stay. Thus the shower head is provided with a sharp corner at the bottom of the inside of the flow channels where resin is intended to flow. Conversely, the outside walls of the flow channels have very large radii to discourage any wicking away from the flow channels.

Achieving an even distribution of material may provide consistent layer thicknesses and consequently good curing performance. In the waste curing system of the present embodiments, flow into the single inlet is split into twenty four separate streams by waste diverter 268 and shower head 270 as discussed above. The design elements discussed may make sure the flow is split evenly amongst the twenty four drip points in shower head 270.

Referring again to FIG. 24, side strips 290 hold several LED elements on one or more Printed Circuit Assemblies (PCAs) which carry out curing on the resin inside the cartridge's container.

In a specific embodiment, the curing function is achieved through at least two such UV LEDs-carrying side strips 290 placed onto polished sheet metal reflectors 292 on each side of container 294. The reflectors 292 may help diffuse the light from the LEDs inside the container thereby improving the evenness of curing. Periodically, as the waste is being generated, the LEDs turn on for a cure cycle to cure the layer of liquid waste that has accumulated on either the floor of the container or on top of the cured resin in the container.

When a cartridge is full, a final curing step is done prior to disposing of the cartridge. As liquid resin is considered hazardous material, it is necessary to cure the residual resin that remains in the distribution channels on the top of the Shower Head before the cartridge is disposed of. A third PCA with UV LEDs may be positioned above the shower head for this purpose. When the waste cartridge is full, the LEDs on the third board are fired. The firing of the third board may cure any remaining liquid resin in shower head 270. The final curing may also serve to seal the holes in the top of the cartridge. As some water can leach out of cured waste resin, such sealing is desirable. Once the final curing step has been done, the cartridge is no longer usable as the drip points in the shower head are sealed.

Figure 27:
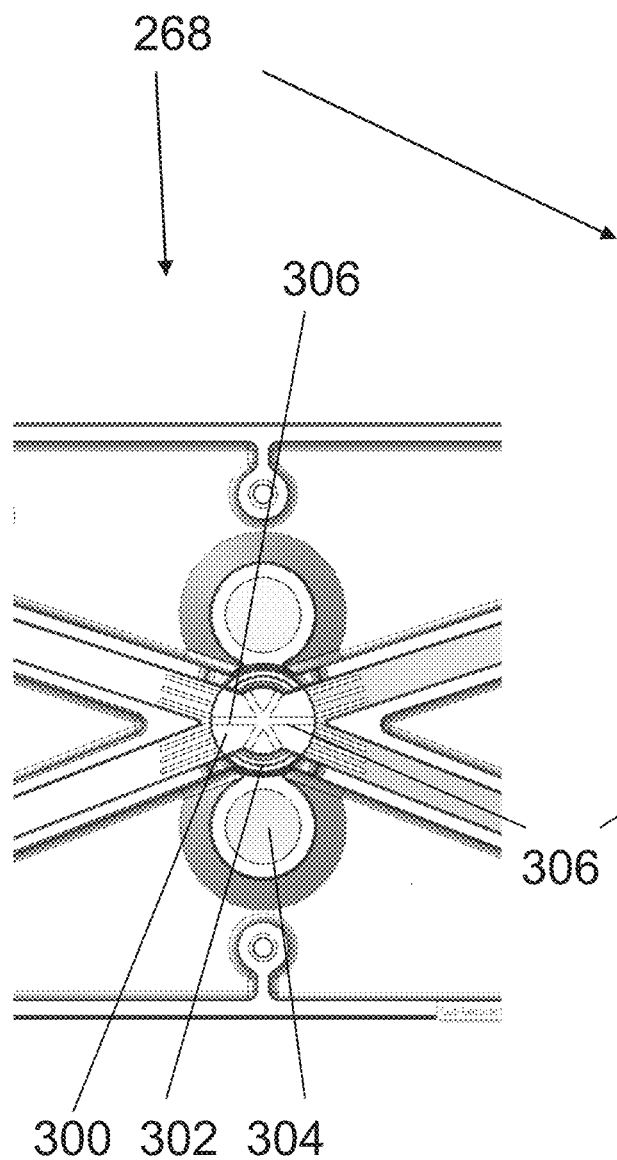
FIGS. 27, 28 and 29 are different perspective views of structure within the waste director component of FIG. 25.
Figure 28:
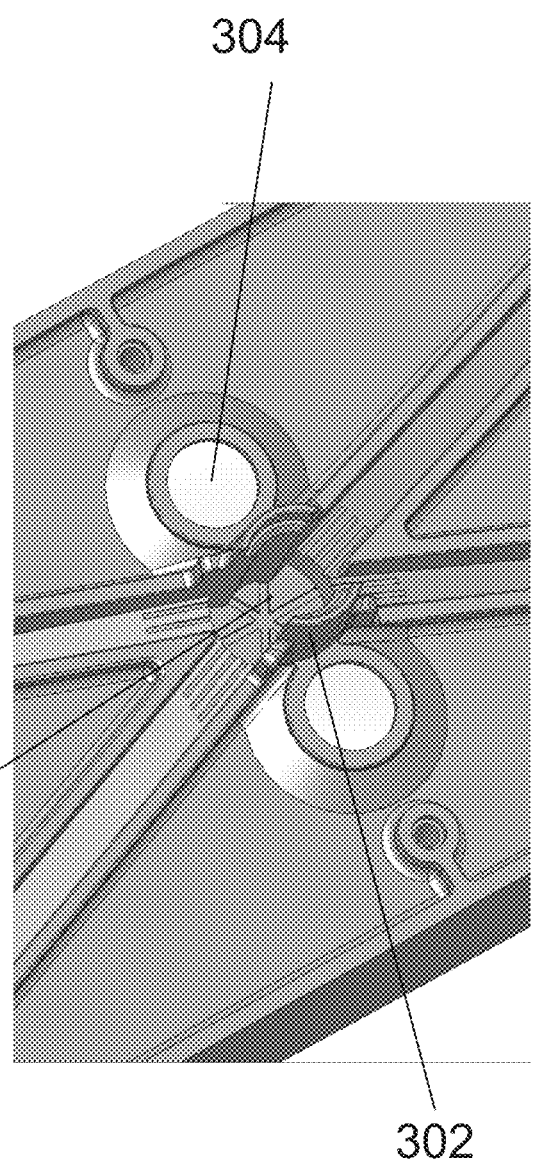
Figure 29:
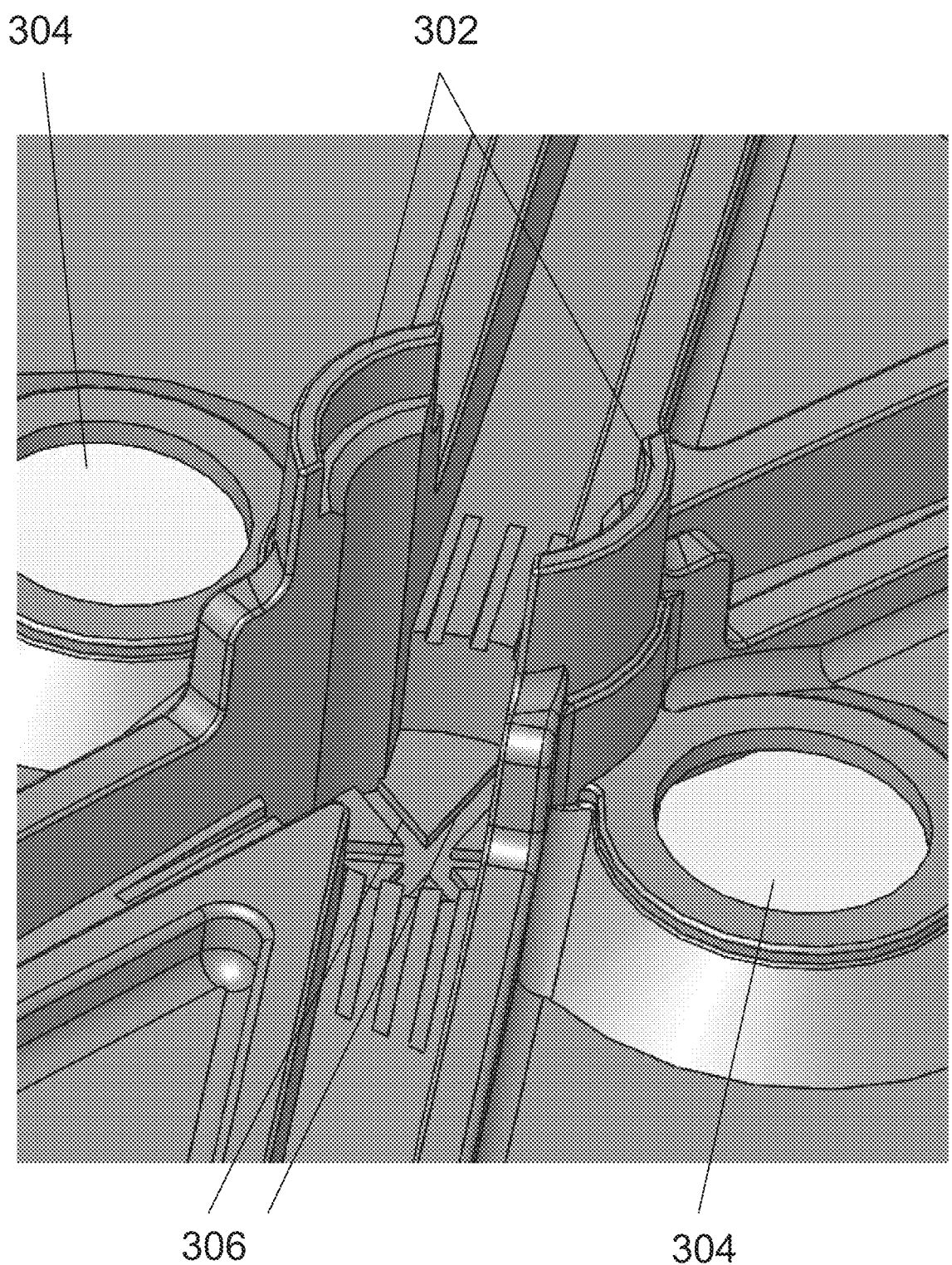

Reference is now made to FIGS. 27, 28 and 29, which show a detail of the waste diverter 268 from three different angles respectively. The incoming waste pipe causes waste to drip to central location 300 where shield walls 302 keep the resin away from UV holes 304. Wicking channels 306 in the surface serve as ducts to divide the resin flow for each of the four outlet directions and cause the dripping resin to start flowing into the four separate directions.

Waste drops into the central location 300, which serves as a small temporary reservoir at the inlet. The reservoir encourages the resin to spread out evenly to the entrances of all four diverter paths. Small wicking channels 306 are formed into the bottom of the reservoir. These, again, aid in getting the resin to spread out across the entire surface of the reservoir. The channels are aimed at lower flow rates where, without them, there is some possibility that the resin could pool to one side and begin wicking preferentially into one or other of the flow paths rather than all of them. Once enough resin accumulates in the reservoir the resin level rises to meet the start of the flow paths. The entrances to the flow paths also incorporate wicking features. The purpose of these is to ensure resin gets pulled into all four paths, again preventing preferential flow down one or two of the paths.

Figure 30:
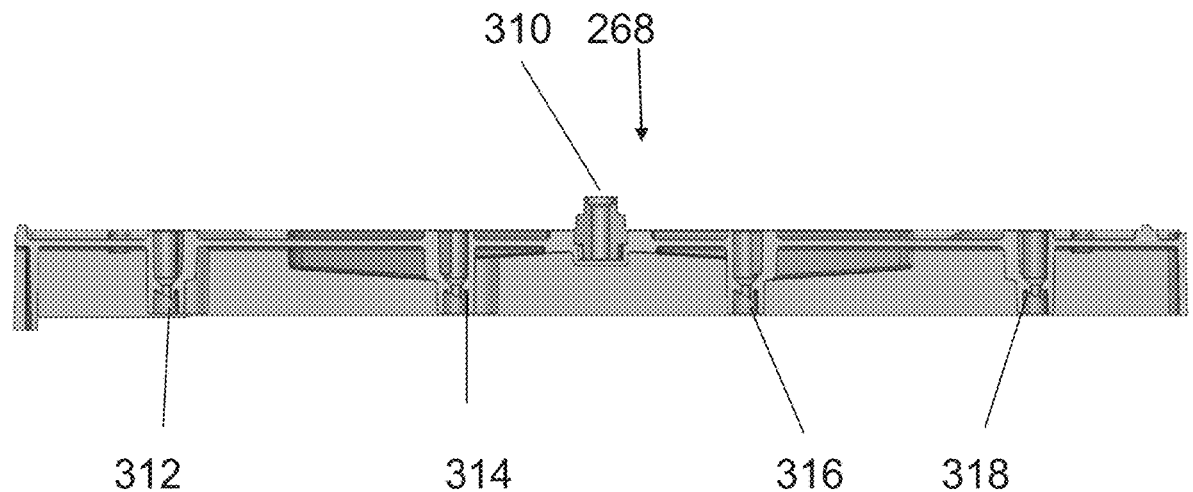
FIG. 30 is a simplified side view of the waste director component of FIG. 25.

FIG. 30 is a schematic cross-sectional diagram of waste diverter 268, showing one inlet 310 dividing into four evenly spaced outlets 312, 314, 316 and 318.

Figure 31:
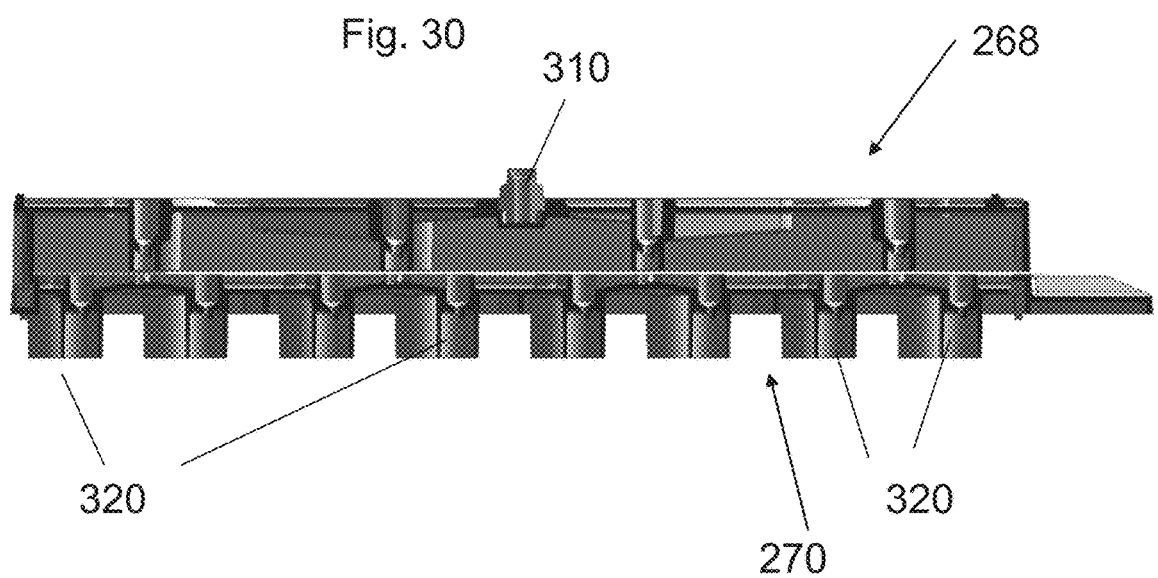
FIG. 31 is a simplified side view of the waste director component of FIG. 25 fitted onto the shower head component of FIG. 26A.

FIG. 31 is a schematic cross-sectional diagram showing waste diverter 268 and the shower head 270 fitted together. As shown, the four outlets of the waste diverter fit with the four inlets of the shower head and further divide the flow to evenly spaced showerhead outlets 320.

Figure 32:
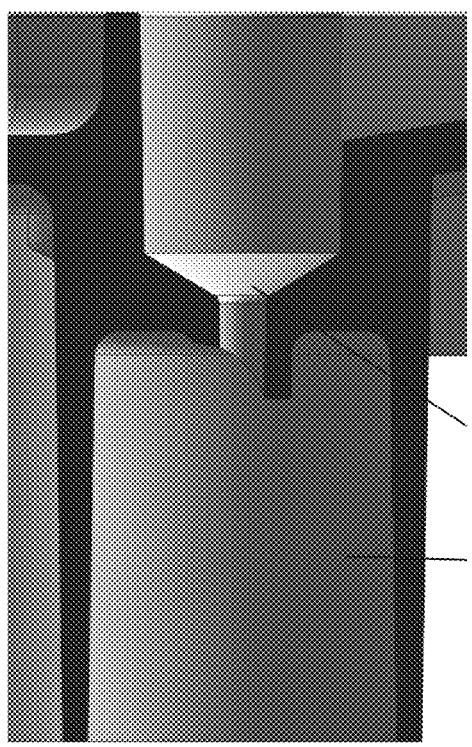
FIGS. 32, 33 and 34 are simplified diagrams showing protection structures for protecting drip openings of the system of FIG. 23 from inadvertent curing.
Figure 33:
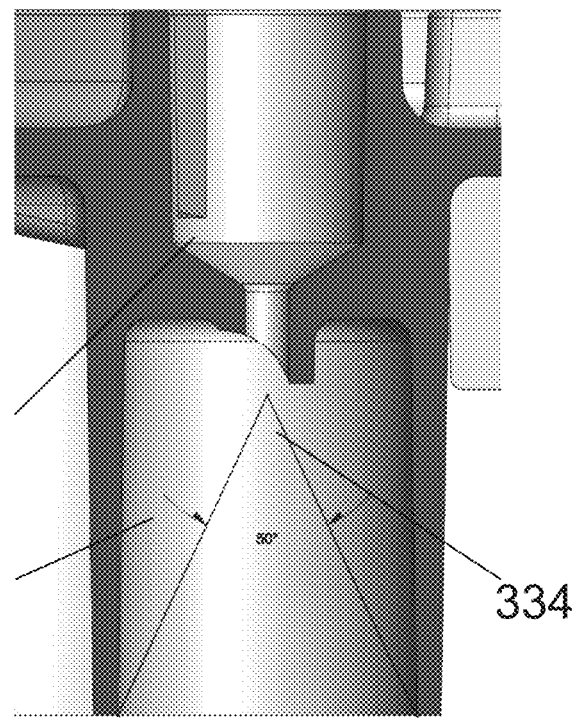
Figure 34:
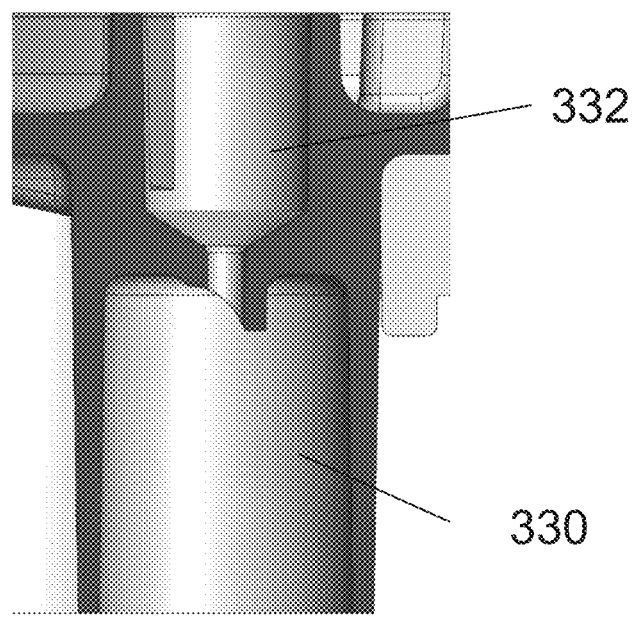

Reference is now made to FIGS. 32, 33 and 34, which illustrate a construction of the nozzles of shower head 270 to prevent clogging of the nozzles due to unintended curing of resin dripping from the nozzle. By necessity, the bottoms of the drip points in both the waste diverter and the shower head need to be exposed to enable drops to fall. This makes them vulnerable to becoming clogged if stray UV light causes resin to cure on them. The shower head is part of the disposable cartridge and therefore only needs to remain clogged for lifetime of a cartridge rather than the life of the product. However, the shower head is subjected to more frequent and larger doses of UV than the waste diverter, making protection of the Showerhead's drip points a challenge as well.

The drip points in both the waste diverter and shower head should thus be protected from stray UV in order to prevent resin from curing while still in contact with them and thus sealing them off. This may be achieved through the incorporation of shield walls as discussed above, which may be arranged to form lamp shade structures 330 around drip nozzles 332. In waste diverter 268, lamp shade structures 330 may extend down to the top of shower head 270 with only minimal clearance allowing for the insertion and removal of the cartridge. In some embodiments, protection is preferably as complete as possible, as waste diverter 268 is intended to last for the life of the printer.

Drip points 320 in shower head 270 also have lamp shades structures 330 to minimize their exposure to UV, as can be seen in FIG. 31. There are several parameters to trade off in sizing lampshade structures 330. The first parameter is the angle from the inside wall to the tip. Experimentally, it has been found that included angles 334 of below 50° (see FIG. 33) provide sufficient protection for the LED/reflector/drip point arrangement of the present embodiments. The second parameter is the inside diameter. If the inside diameter is too close to the drip point, then resin can bridge the drip point and the inside wall of the lamp shade and may begin dripping from the lamp shade rather the drip director, resulting in stalactite formation. Another feature which helps to prevent stalactite formation are the radii at the root of the drip point and the lamp shade. Having large radii here discourages wicking of the resin from the drip point to the lamp shade. The final tradeoff parameter is height. The larger the diameter grows (desirable for stalactite prevention) and the smaller the included angle to the tip (desirable from a drip point protection perspective, the taller the lamp shade needs to be. However, the taller the lamp shade is, the less usable height there is in the cartridge. The challenge is to get the lamp shade diameter to the smallest one which will prevent stalactite formation and the largest included angle that will prevent clogging in order to maximize the usable volume in the Cartridge.

Figure 35:
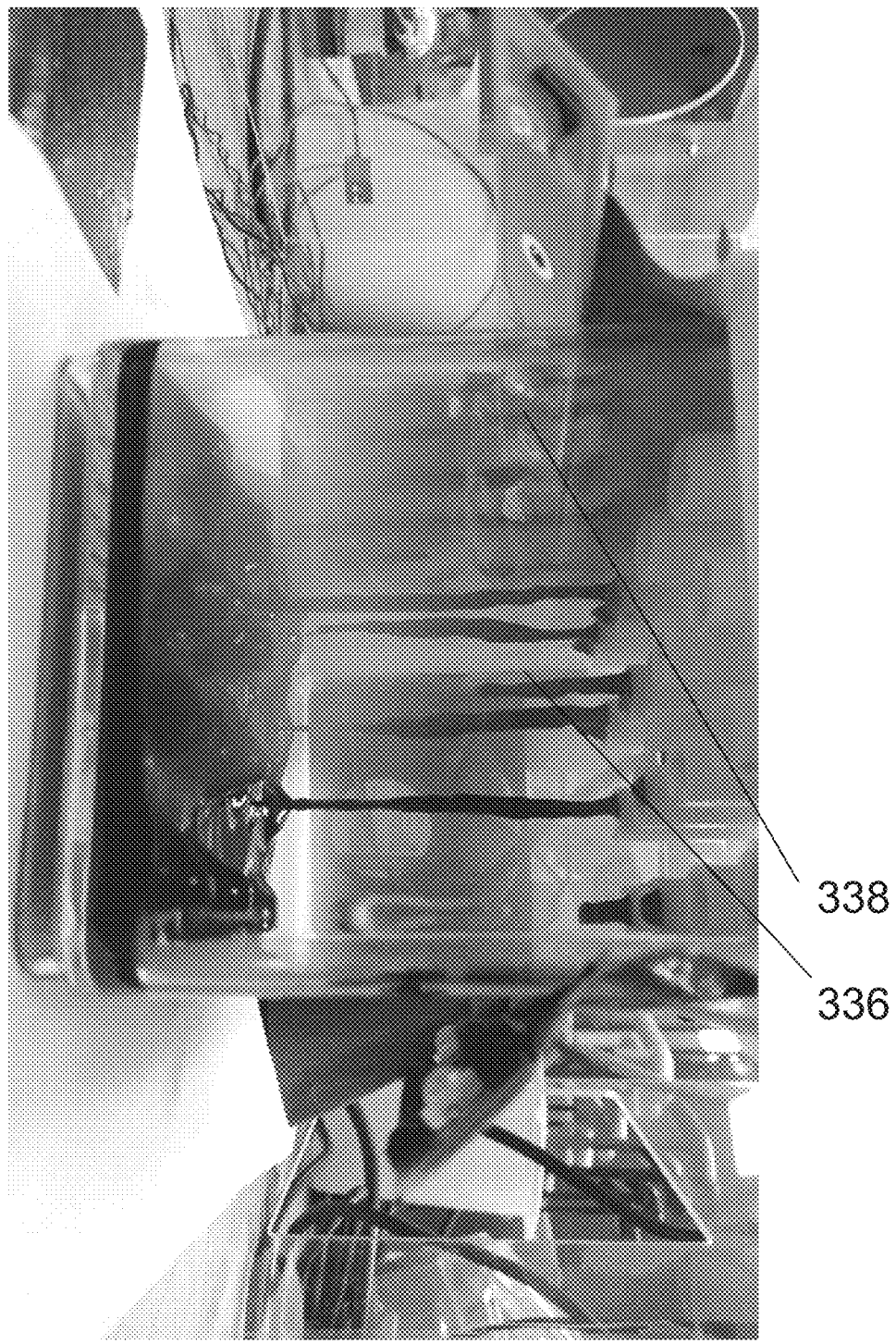
FIG. 35 illustrates stalactite formation from insufficiently protected drip openings.

Reference is now made to FIG. 35 which illustrates stalactites 336 forming on improperly shielded nozzles 338. The stalactites clog the nozzles and render the cartridge useless long before it is full.

Figure 36:
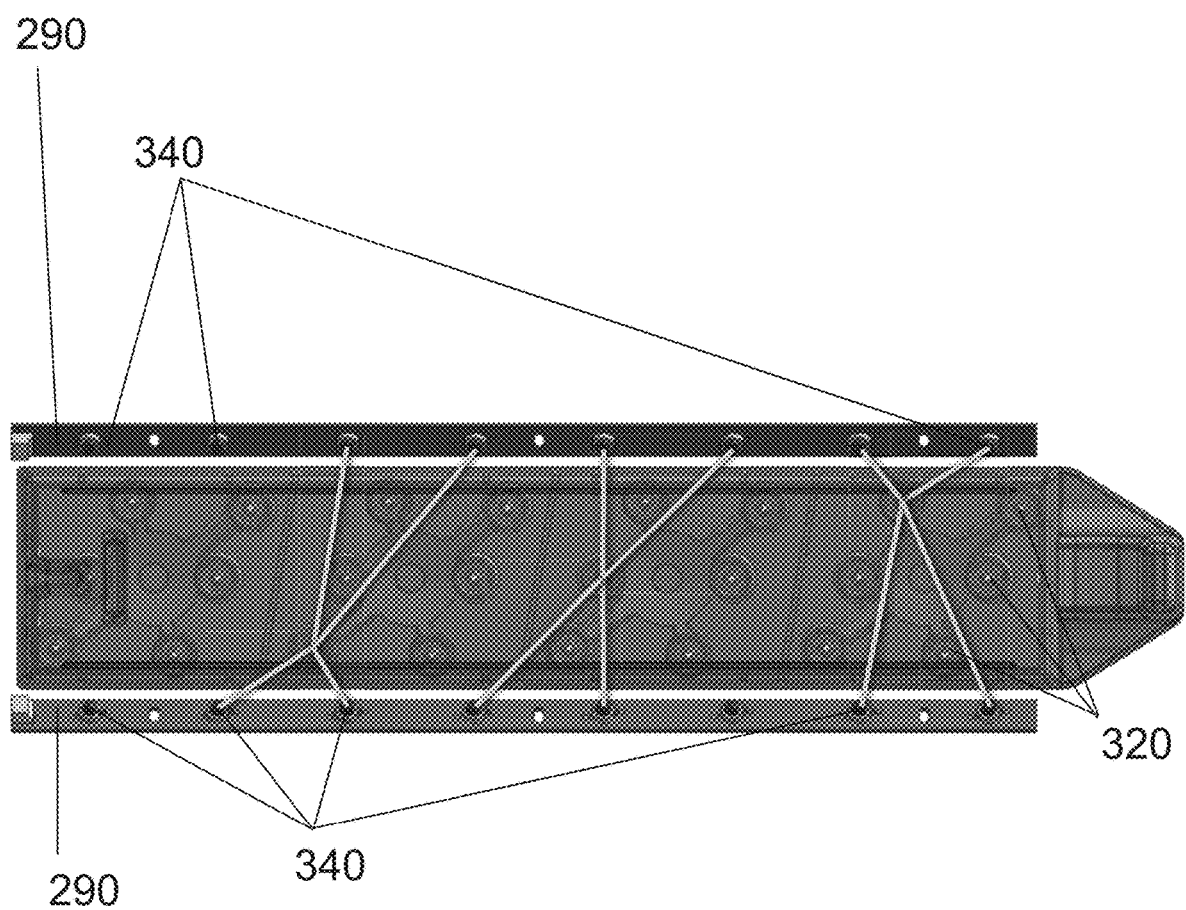
FIG. 36 illustrates LED and drip hole interrelationships to ensure uniform curing according to embodiments of the present invention.

Reference is now made to FIG. 36, which is a view from below of showerhead 270 with LED lamps 340 installed on either side of the cartridge. The figure illustrates an arrangement of LED lamps 340 around the drip points of shower head 270 to provide curing which is as uniform as possible.

One of the challenges with the design of the waste curing system has been ensuring even UV exposure even when stalactites/stalagmites form. Meeting this challenge requires special attention to the placement of LEDs 340 and drip points 320 relative to one another. Drip points 320 are arranged in eight slanted columns of three each. At the same time on each UV LEDs-carrying side stripe 290 of the present embodiment there are eight LEDs. The arrangement may ensure that the areas where every drop lands have direct line of sight from three to four LEDs, so that regions obtain LED exposure even if stalactites/stalagmites form and occlude from one or other direction. The arrangement of FIG. 36 has been effective at preventing pools of uncured resin caused by shadows.

Reference is now made to FIG. 37, which illustrates a Virtual Waste Pipeline (VWP) model of the printing waste disposal process according to embodiments of the present invention. The VWP models the actual waste pipeline in the printer in order to calculate resin flows and UV exposure needs and timing.

UV dosage control presents several challenges: applying the appropriate dose for the material, timing the dose as the right amount of material has arrived in the cartridge, and not under or over-dosing. The VWP model helps overcoming these challenges. At a high level, the VWP enables tailoring dosage timing to account for different materials, varying volumes associated with different types of operations, and the timing differences for transport of the waste to the cartridge, as well as their combined effects. The virtual pipeline may be used to compensate for the significant variety of conditions that the product will encounter out in the field.

UV dosage has an effect on waste curing performance. There are a range of dosages that work well for a given condition (resin type(s), flow rate). Therefore, getting the dosage exactly right is not necessary. However, too much or too little UV exposure may cause issues as discussed hereinabove. Timing of the dosage is also relevant. If a too thick layer forms in the container between curing events then the material comprised in the lower portion of the layer will be under-dosed. On the other hand, if the curing event happens too soon, then not all of the material may be in the container when the cure event is executed; this can result in the layer thickness for the following cure cycle being too high.

As mentioned above, overdosing of UV light can lead to stalagmite formation and cause occultation and thus curing shadows (caused by the stalagmite structure). Underdosing of UV light can lead to hollows comprising liquid resin that can no longer be cured. The doses needed for different materials varies, and what may be underdosing for one resin type may be overdosing for another resin type.

The VWP model is based on dosage units (DUs) which correspond to a volume of waste resin material multiplied by a cure factor, which is directly linked to the curing response of said resin material to the UV energy. In case the waste resin is "pure" (composed of one single type of resin), then a single cure factor is applied. On the other hand, if the waste resin is a "composite" material (comprises more than one type of resin), then several cure factors are applied, each one to the respective volume of each collected resin material. Determining the volume of waste for each specific resin material may be calculated on the basis of the volume of resin used for printing the object until the waste is collected (knowing the number of voxels printed with each resin material) and the amount of waste material removed by the roller or during print heads cleaning events. The DU model is applied at the different inlets along the pipeline, so one can model the time it takes actual waste resin from different sources to reach the cartridge. There are generally three different waste generation events, one being the waste material removed by the roller, and two other being generated by cleaning events of the print heads in the service station. Printing is carried out using the print head and nozzles, and the roller passes over the surface and mops, removing some 20% of the material and more generally between 10 and 30%. As a result the volume of the material to print is obtained and it is possible to infer how much waste material is being produced. The estimate provides a guide as to the amount of curing energy needed.

In some embodiments, waste material flows slowly through the pipes to the cartridge. As mentioned above, gravity is the main feed factor, so there is time between making the estimates and carrying out the curing. With gravity as the main feed factor the rate depends at any given time on the amount of waste generated. The more waste generated the faster the waste resin is fed through the pipes. These complications mean that there is no one size fits all dosage that prevents under-dosing with hard to cure resins and over-dosing with easy to cure resins. The same is true of timing of dosage timing. There is not a single timing between curing events or after servicing that will prevent over-curing and under-curing the material in all situations. To address these issues, the VWP model of FIG. 37 may be used.

A dosage unit applies the resin material, again allowing estimates to be made of the amount expected in the waste cartridge. The process of cleaning the print head, also provides waste but in smaller amounts although again predictable.

It is possible to add one or more accumulators comprising a small tank near the cleaning station and/or the roller, in order to (1) accumulate waste material and (2) release said accumulated waste material when a pre-determined volume threshold is reached. As the volume of waste material released by the accumulator is known, the amount of resin arriving at the cartridge and requiring curing is known with even greater accuracy and appropriate curing energy (or DUs) may be applied. The accumulator(s) can be also used to introduce waste material into the pipeline at a predetermined rate. The rate limiting feature may be of importance when events producing a large volume of waste material occur (e.g. print head material emptying event at the cleaning station), and control the volume of waste material entering the curing system. This also allows a stricter control of DUs to be applied.

In the VWP model, the pipeline itself may be divided into cells. The DUs are added to the current DU total for that cell. At a configurable interval, the cell contents all shift down to the next cell. At the end of the pipeline 356 the last cell's contents are added to the cartridge cell 358.

When enough resin has reached the cartridge, a cure cycle is initiated (applying a specific number of DU) and the resin in the cartridge cell is zeroed. The cycle continues throughout the printing process.

FIG. 37 illustrates resin accumulation 350 from the roller as well as two resin waste sources 352 and 354 associated with the cleaning station. Resin flows through pipe 356 at a steady rate so that the time of arrival at cartridge cell 358 depends on the length of pipe that has to be travelled. Delays can be entered in the calculation for each event so that the curing energy can be timed for the arrival of the resin.

It is expected that during the life of a patent maturing from this application many relevant additive manufacturing technologies will be developed and the scope of the term "additive manufacture" is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Method for waste ink management during additive manufacturing comprising:
   delivering ink to an additive manufacturing location;
   collecting waste ink from the additive manufacturing location, said waste ink collecting comprising:
   collecting said waste ink from a roller or from printing head servicing, and
   distributing said waste ink evenly over a waste collecting cartridge using a plurality of distributed drip nozzles, the drip nozzles having openings into said waste collecting cartridge which openings are distributed around said waste collecting cartridge;

curing said waste ink upon collection, said curing comprising radiating curing energy evenly over said waste collecting cartridge;

detecting when said waste collecting cartridge is full, and irradiating drip pipes associated with said drip nozzles to cure undripped ink.

2. The method of claim 1, comprising:

monitoring a waste ink flow rate; and operating said curing in accordance with said waste ink flow rate.

3. The method of claim 1, wherein said waste ink curing comprises:

collecting the waste ink in liquid form; and curing the waste ink with curing energy from a curing energy source.

4. The method of claim 3, comprising operating said curing energy source after allowing for said ink to be evenly distributed in said waste collecting cartridge.

5. The method of claim 4, comprising delaying said operating said curing energy source to allow time for droplets of said waste ink dropped into said waste collecting cartridge to merge.

* * * * *